US012577080B2

(12) United States Patent
Fukasawa

(10) Patent No.: US 12,577,080 B2
(45) Date of Patent: Mar. 17, 2026

(54) PRINTING APPARATUS

(71) Applicant: SEIKO EPSON CORPORATION, Tokyo (JP)

(72) Inventor: Koki Fukasawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 243 days.

(21) Appl. No.: 18/342,120

(22) Filed: Jun. 27, 2023

(65) Prior Publication Data

US 2024/0002188 A1 Jan. 4, 2024

(30) Foreign Application Priority Data

Jun. 29, 2022 (JP) ................................. 2022-104323

(51) Int. Cl.
*B41J 15/16* (2006.01)
*B65H 54/22* (2006.01)
*G03G 15/00* (2006.01)

(52) U.S. Cl.
CPC .............. *B65H 54/22* (2013.01); *B41J 15/16* (2013.01); *G03G 15/652* (2013.01)

(58) Field of Classification Search
CPC ........ B41J 15/16; B65H 54/22; G03G 15/652
See application file for complete search history.

(56) References Cited

U.S. PATENT DOCUMENTS

2015/0328909 A1* 11/2015 Takizawa ............. B65H 20/005 242/419
2018/0104969 A1* 4/2018 Nakata ................... B41J 15/165
2023/0415502 A1* 12/2023 Fujiwara ................. B41F 17/00

FOREIGN PATENT DOCUMENTS

JP 2899187 B2 * 6/1999
JP 2009-143147 A 7/2009
JP 2011246257 A * 12/2011
JP 2018202758 A * 12/2018
JP 2019152780 A * 9/2019
JP 2023005560 A * 1/2023
WO WO-2015199107 A1 * 12/2015 .............. B41J 15/16

* cited by examiner

*Primary Examiner* — Christopher E Mahoney
*Assistant Examiner* — Marissa Ferguson-Samreth
(74) *Attorney, Agent, or Firm* — WORKMAN NYDEGGER

(57) ABSTRACT

A printing apparatus includes a transport roller, a printing unit, and a winding angle changing unit. The transport roller is configured to apply a transport force to the printing medium and transport the printing medium. The printing unit is configured to perform printing on the printing medium transported. The winding angle changing unit is provided upstream of the transport roller in a transport direction of the printing medium and configured to change a winding angle at which the printing medium comes into contact with an outer circumferential surface of the transport roller.

13 Claims, 7 Drawing Sheets

RD
| MEDIUM TYPE | WINDING ANGLE θ |
|---|---|
| MEDIUM A | θ1 |
| MEDIUM B | θ2 |
| MEDIUM C | θ3 |
| ⋮ | ⋮ |
FIG. 7
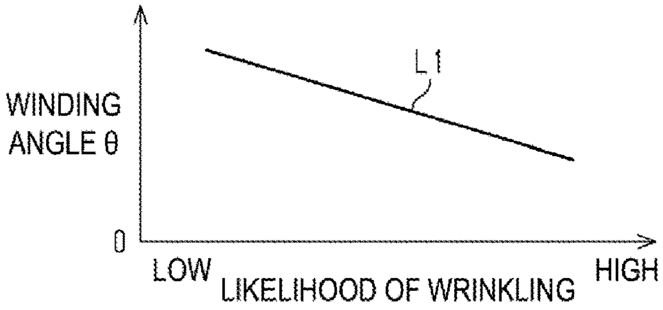
FIG. 8
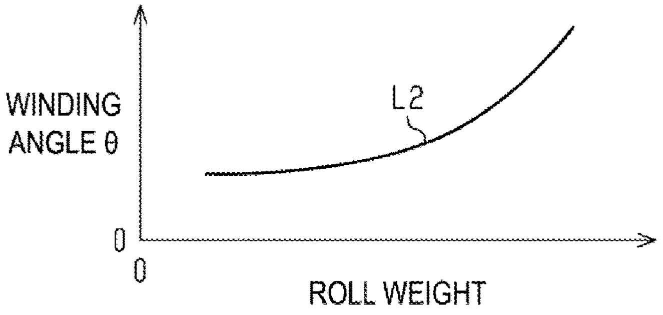
FIG. 9
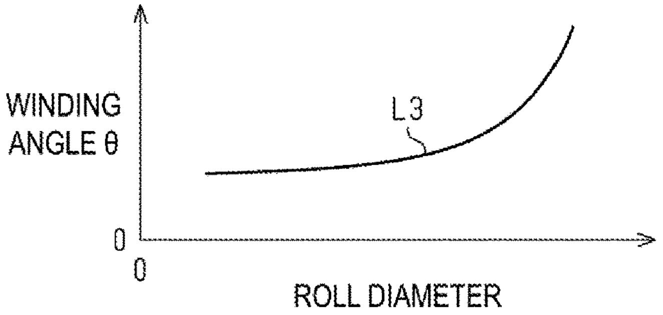
FIG. 10

PRINTING APPARATUS

The present application is based on, and claims priority from JP Application Serial Number 2022-104323, filed Jun. 29, 2022, the disclosure of which is hereby incorporated by reference herein in its entirety.

BACKGROUND

1. Technical Field

The present disclosure relates to a printing apparatus including a transport roller that transports a printing medium, and a printing unit that performs printing on the printing medium.

2. Related Art

JP-A-2009-143147 discloses a printing apparatus that includes a printing unit that performs printing on a printing medium such as roll paper. This printing apparatus includes a feeding mechanism that feeds the printing medium from a roll, a winding mechanism that winds the printing medium after printing into a roll, and a transport roller pair that transports the printing medium in the middle of a path between the feeding mechanism and the winding mechanism. The transport roller pair includes a transport roller and a driven roller that feed the printing medium to a printing position of the printing unit. The printing apparatus includes a tension applying mechanism that applies tension to the printing medium during transport. With the tension applied, an occurrence of floating and wrinkling of the printing medium positioned upstream of the transport roller in the transport direction is suppressed.

However, the floating and the wrinkling that occur in the printing medium upstream of the transport roller in the transport direction are eliminated or reduced as the tension-applied printing medium slips against the transport roller. Printing media differ in a frictional force that occurs with the transport roller depending on factors such as a difference in type (material, thickness, or the like) and a difference in environment such as humidity. As a result, there is a problem in that simply applying tension to the printing medium or adjusting the tension using the tension applying mechanism is insufficiently effective in suppressing wrinkling. Further, when the printing medium is likely to slip excessively against the transport roller, a transport position accuracy when the transport roller transports the printing medium to the printing position deteriorates. In this case, printing defects such as print misalignment are likely to occur.

SUMMARY

A printing apparatus for solving the problems described above includes a transport roller, a printing unit, and a winding angle changing unit. The transport roller is configured to apply a transport force to a printing medium and transport the printing medium. The printing unit is configured to perform printing on the printing medium transported. The winding angle changing unit is provided upstream of the transport roller in a transport direction of the printing medium and configured to change a winding angle at which the printing medium comes into contact with an outer circumferential surface of the transport roller.

BRIEF DESCRIPTION OF THE DRAWINGS

FIG. 7 is a table of reference data illustrating a correspondence relationship between a medium type and a winding angle θ.

FIG. 8 is a graph showing a relationship between likelihood of wrinkling in a medium and the winding angle θ.

FIG. 9 is a graph showing a relationship between a roll weight and the winding angle θ.

FIG. 10 is a graph showing a relationship between a roll diameter and the winding angle θ.

DESCRIPTION OF EXEMPLARY EMBODIMENTS

First Exemplary Embodiment

A printing apparatus according to a first exemplary embodiment will be described below with reference to the accompanying drawings.

Figure 1:
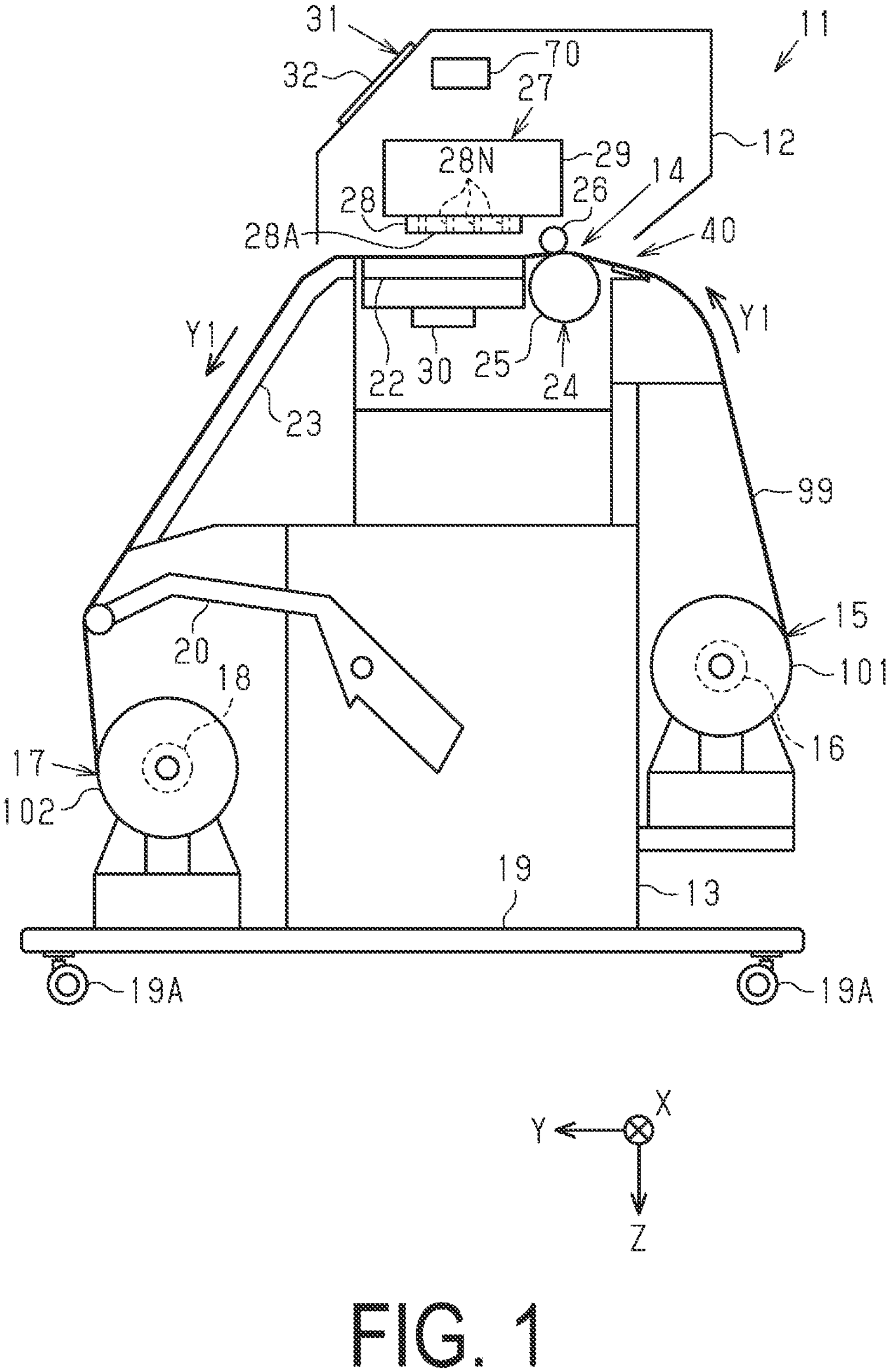
FIG. 1 is a schematic side sectional view of a printing apparatus according to an exemplary embodiment.

A printing apparatus 11 illustrated in FIG. 1 is placed on a horizontal surface. An X-axis, a Y-axis, and a Z-axis are coordinate axes parallel to a width direction, a depth direction, and a vertical direction, respectively. In view of a printing medium 99 transported during printing, the X-axis is parallel to the width direction of the printing medium 99. Therefore, hereinafter, the X-axis is also referred to as a width direction X. A transport direction in which the printing medium 99 is transported at a printing position where printing is performed on the printing medium 99 is parallel to the Y-axis, and thus is also referred to as a transport direction Y. A direction in which the printing medium 99 is transported along a transport path is also referred to as a transport direction Y1. The transport direction Y1 changes depending on a position on the transport path. Note that the width direction X is a direction intersecting (orthogonal to, for example) the transport direction Y1.

As illustrated in FIG. 1, the printing apparatus 11 is, for example, an inkjet-type printer configured to print characters, images, or the like onto the printing medium 99 (hereinafter also simply referred to as "medium 99"), such as a sheet, by ejecting a liquid such as ink onto the printing medium 99. The printing apparatus 11 includes a housing 12 and a base 13 that supports the housing 12.

As illustrated in FIG. 1, the printing apparatus 11 includes a transport unit 14 that transports the medium 99. The transport unit 14 includes a transport roller pair 24. The transport roller pair 24 includes a transport roller 25. The transport roller 25 applies a transport force to the medium 99 and transports the medium 99. In this example, the transport roller pair 24 includes the transport roller 25 and a driven roller 26 driven by the transport roller 25. The driven roller 26 is biased toward the transport roller 25 via a biasing mechanism (not illustrated).

The printing apparatus 11 includes a feeding unit 15 that supports a roll 101 obtained by winding the medium 99 into a roll shape at a position upstream of the transport unit 14 in the transport direction Y1, and feeds the medium 99 from the roll 101. The feeding unit 15 supports the roll 101 in a rotatable state. The feeding unit 15 includes a feeding motor 16 that is a driving source that rotates the roll 101 in a direction in which the medium 99 is fed.

The transport unit 14 transports the medium 99 long in shape and fed from the roll 101 by the feeding unit 15. The transport roller 25 of this example rotates with the medium 99 in a nipped state between the transport roller 25 and the driven roller 26, thereby applying a transport force to the medium 99. The transport unit 14 is provided inside the housing 12 and transports the medium 99 along a predetermined transport path.

The printing apparatus 11 includes a printing unit 27 that performs printing on the medium 99 transported. The printing unit 27 includes an ejecting unit 28 that ejects liquid onto the medium 99 transported by the transport unit 14. The printing apparatus 11 of this example is a serial printer in which the ejecting unit 28 scans the medium 99 in a scanning direction X. The printing unit 27 includes a carriage 29 that moves in the scanning direction X intersecting the transport direction Y1 at a position above the medium 99 transported, and the ejecting unit 28 provided at a lower portion of the carriage 29. The ejecting unit 28 is an ejection head capable of ejecting liquid from a nozzle 28N. The ejecting unit 28 and the carriage 29 are disposed inside the housing 12. Note that the scanning direction X is a direction intersecting the transport direction Y1 and is equivalent to the width direction X.

The ejecting unit 28 ejects liquid onto a portion of the medium 99 supported by a support 22. The ejecting unit 28 includes a nozzle face 28A facing the support 22 and a plurality of the nozzles 28N opening at the nozzle face 28A. While the carriage 29 moves in the scanning direction X, the ejecting unit 28 ejects liquid from the nozzles 28N toward the medium 99.

The printing apparatus 11 includes the support 22 including a support face 22A (refer to FIG. 2) that supports the medium 99. At a printing position facing the ejecting unit 28 in the transport direction Y1, the medium 99 is supported by the support face 22A of the support 22 and transported in the transport direction Y.

As illustrated in FIG. 1, the printing apparatus 11 includes a winding unit 17 that winds, as a roll 102, the medium 99 on which characters or images have been printed by ejection of the liquid. The winding unit 17 includes a winding motor 18 serving as a driving source for winding the roll 102. The winding unit 17 is supported on a moving base 19 that supports the base 13. The moving base 19 is provided with a plurality of casters 19A for moving the printing apparatus 11.

The printing apparatus 11 includes a tension bar 20 that applies tension to the medium 99 before being wound by the winding unit 17. A length of the medium 99 between the winding unit 17 and the transport unit 14 changes in accordance with a difference between a transport amount by which the transport unit 14 transports the medium 99 and a winding amount by which the winding unit 17 winds the medium 99. The tension bar 20 comes into contact with the medium 99 between the winding unit 17 and the transport unit 14 and is displaced while applying a force due to its own weight to the medium 99, thereby applying an appropriate tension to the medium 99. The tension applied to the portion of the medium 99 between the transport roller pair 24 and the winding unit 17 is referred to as front tension. With the front tension applied to the medium 99, floating of the medium 99 from the support 22 and wrinkling are suppressed. When the medium 99 floats at a portion of the support 22, the medium 99 may come into contact with the nozzle face 28A of the ejecting unit 28, or print misalignment may occur in which a landing position on the medium 99 of liquid such as ink ejected from the ejecting unit 28 is misaligned.

The printing apparatus 11 includes, as members that form the transport path of the medium 99, an upstream support portion 21 and a downstream support portion 23 in addition to the support 22. The upstream support portion 21, the support 22, and the downstream support portion 23 form the transport path that transports the medium 99 between the feeding unit 15 and the winding unit 17. The upstream support portion 21, the support 22, and the downstream support portion 23 are disposed in this order from upstream to downstream in the transport path.

The upstream support portion 21 (hereinafter also simply referred to as "support portion 21") is provided upstream of the transport roller 25 in the transport direction Y1 and supports the medium 99. The support portion 21 supports the medium 99 in a portion of a range from the feeding unit 15 to the transport unit 14.

The support 22 is provided in a position downstream of the transport unit 14 in the transport direction Y, and supports the medium 99 in a range facing a scanning region of the ejecting unit 28. The downstream support portion 23 supports a portion of the medium 99 on which printing was performed by the ejecting unit 28. The downstream support portion 23 supports the medium 99 in a portion of a range downstream of the support 22 and upstream of the winding unit 17.

In the example illustrated in FIG. 1, the support 22 is horizontally disposed inside the housing 12. The upstream support portion 21 and the downstream support portion 23 are disposed in an inclined state, each increasing in a height position as a distance to the support 22 decreases.

Figure 2:
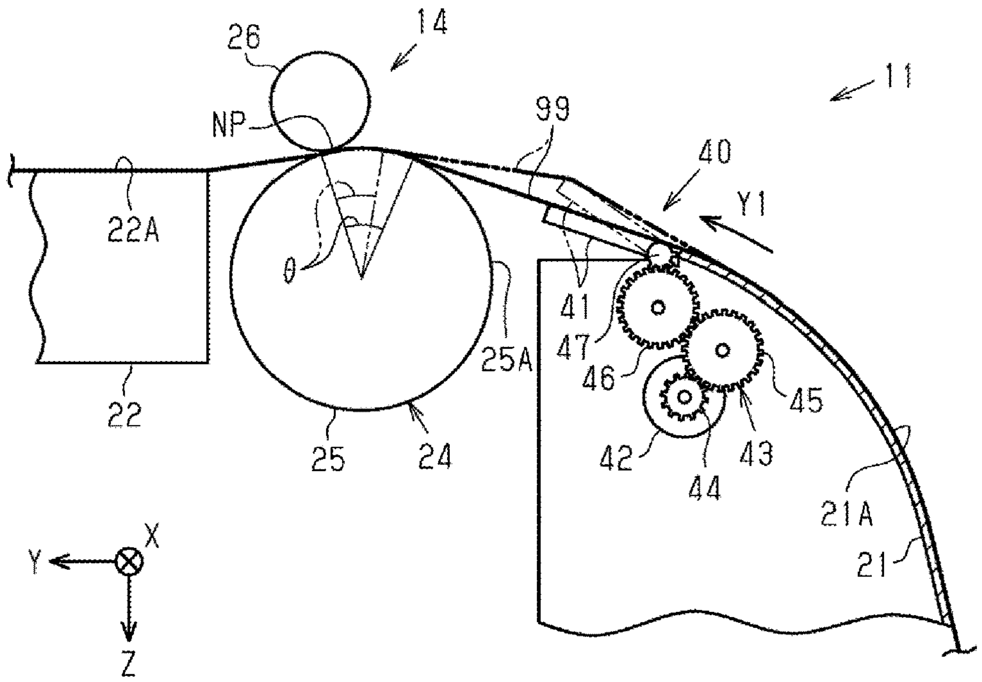
FIG. 2 is a schematic side sectional view illustrating a winding angle changing unit.

The feeding unit 15 is positioned below the transport unit 14 and the support portion 21 in the vertical direction Z. That is, a height of the feeding unit 15 is lower than respective heights of the transport unit 14 and the support portion 21. Therefore, the support face 21A of the support portion 21 is a curved surface as illustrated in FIG. 2. The support portion 21 includes the support face 21A formed of an upwardly convex curved surface, increasing in a height position in the vertical direction Z as a distance to the support 22 decreases.

As illustrated in FIG. 2, the transport roller 25 constituting the transport roller pair 24 is a driving roller that uses a transport motor 72 (refer to FIG. 6) as a driving source and rotates by the driving force. The transport roller 25 and the driven roller 26 transport the medium 99 by rotating with the medium 99 in a nipped state sandwiched therebetween. The transport roller 25 and the driven roller 26 are positioned upstream of the support 22 in the transport direction Y, and transport the medium 99 onto the support face 22A of the support 22.

As illustrated in FIG. 1, the printing apparatus 11 may include a suction mechanism 30 that suctions, attracting the medium 99 to the support 22. The suction mechanism 30 is assembled to, for example, a lower portion of the support 22. The support 22 includes one or a plurality of suction holes (not illustrated) that open at the support face 22A supporting the medium 99. The suction mechanism 30 suctions the medium 99 to the support 22, thereby suppressing the occurrence of floating and wrinkling of the medium 99 at the printing position facing the ejecting unit 28.

As illustrated in FIG. 1, the printing apparatus 11 includes a winding angle changing unit 40 that changes a winding angle θ (refer to FIG. 2) at which the medium 99 transported along the support face 21A comes into contact with the transport roller 25. The winding angle changing unit 40 is assembled to an apparatus frame forming the support portion 21, for example.

Configuration of Winding Angle Changing Unit 40

Next, a configuration of the winding angle changing unit 40 will be described with reference to FIGS. 2 and 3. As illustrated in FIG. 2, the winding angle changing unit 40 is provided upstream of the transport roller 25 in the transport direction Y1 of the medium 99 and configured to change the winding angle θ at which the medium 99 comes into contact with an outer circumferential surface 25A of the transport roller 25.

The winding angle changing unit 40 includes a flap 41 that changes the winding angle θ. The flap 41 is configured to change in angle with respect to the support face 21A of the support portion 21 at a portion of the support portion 21 on the transport roller 25 side.

As illustrated in FIG. 2, the winding angle changing unit 40 includes a motor 42 that is a driving source for changing the angle of the flap 41, and a power transmission mechanism 43 that transmits the driving force of the motor 42 to the flap 41. The power transmission mechanism 43 is constituted by a toothed gear train, for example. The power transmission mechanism 43 includes a toothed drive gear 44 fixed to an output shaft of the motor 42, a plurality of toothed gears 45, 46 that sequentially transmit rotation of the toothed drive gear 44, and a toothed input gear 47 that meshes with the toothed output gear of the toothed gears 45, 46. The toothed input gear 47 is fixed to a base portion of the flap 41.

As illustrated in FIG. 2, the flap 41 is configured to change in angle, making it possible to adjust the winding angle θ within a range of predetermined winding angles θ including a small winding angle θ indicated by a solid line in FIG. 2 and a large winding angle θ indicated by a two dot chain line in FIG. 2. Then, the flap 41 is changed in angle, changing a direction in which the medium 99 enters the outer circumferential surface of the transport roller 25. With this change in the entering direction of the medium 99, the winding angle θ is changed.

Figure 3:
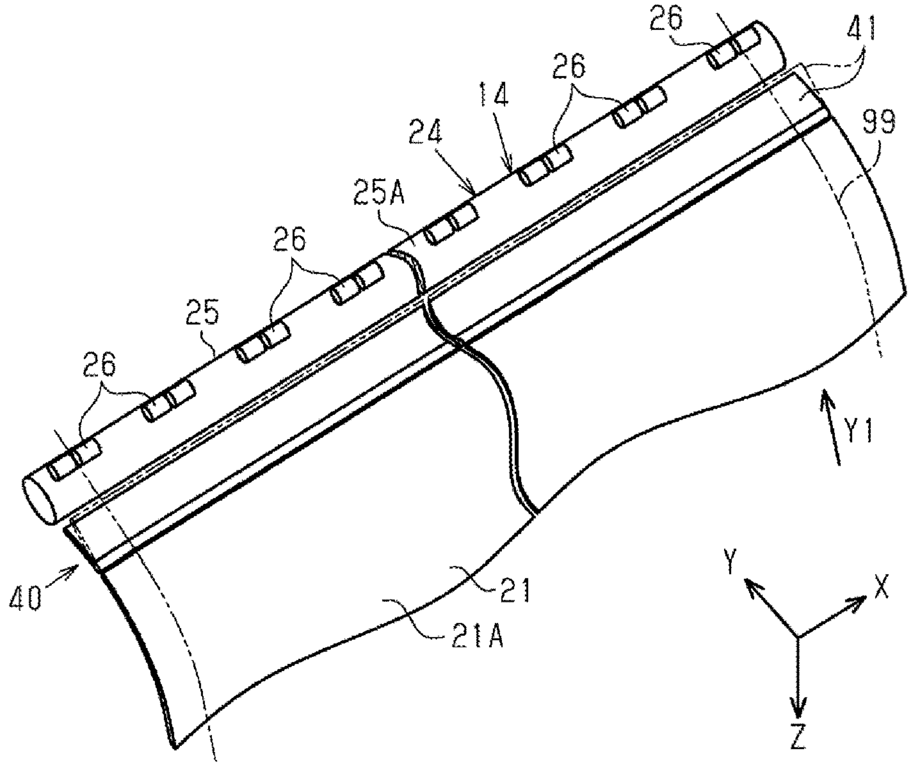
FIG. 3 is a partial perspective view illustrating the winding angle changing unit and a transport roller pair.

As illustrated in FIG. 3, the flap 41 has a width dimension slightly larger than a maximum width of the medium 99, for example. The flap 41 changes in angle within a predetermined angle range including a first angle indicated by a solid line in FIG. 3 and a second angle indicated by a two dot chain line in FIG. 3. By the flap 41, the medium 99 is adjusted in the direction of entering the outer circumferential surface 25A of the transport roller 25 across the entire width region. Note that, rather than the flap 41 being constituted by one plate member extending in the width direction X, a configuration that includes a plurality of the flaps 41 arrayed spaced apart in the width direction X in a range extending across the maximum width of the medium 99 may be adopted.

Note that, as illustrated in FIG. 3, the transport roller pair 24 includes one transport roller 25 and a plurality of the driven rollers 26 disposed facing the transport roller 25 with gaps therebetween in the width direction X. The medium 99 is not nipped at a portion corresponding to between the driven rollers 26. In the medium 99, floating and wrinkling are relatively likely to occur at the plurality of locations not nipped by the driven rollers 26. In this case, a back tension B is acting on the medium 99 and thus, as the wrinkling, so-called longitudinal wrinkling extending in the transport direction Y1 is likely to occur. Note that, in the following, floating and wrinkling are collectively referred to as "wrinkling." The principle of eliminating or reducing floating is the same as that for wrinkling.

By adjusting a frictional force F between the medium 99 and the outer circumferential surface 25A of the transport roller 25, a wrinkle suppression effect and a transport position accuracy improvement effect can be achieved. As illustrated in FIG. 2, a portion of the medium 99 transported into a nipping position NP of the transport roller pair 24 receives the frictional force F corresponding to the winding angle θ of the winding around the outer circumferential surface 25A of the transport roller pair 24. When the frictional force F is decreased, the medium 99 with wrinkling slips along the outer circumferential surface 25A of the transport roller 25, thereby eliminating or reducing the wrinkling. The back tension acts on a portion of the medium 99 upstream of the transport roller pair 24 in the transport direction Y1, causing the medium 99 to slip in the width direction X against the outer circumferential surface 25A of the transport roller 25, thereby eliminating or reducing the longitudinal wrinkling or the like. The medium 99 slipping against the transport roller 25 reduces the transport position accuracy when the medium 99 is transported to the printing position. Therefore, to improve the transport position accuracy, it is necessary to reduce the slipping of the medium 99. The likelihood of wrinkling differs in accordance with the type of the medium 99 (medium type). In this exemplary embodiment, the frictional force F is adjusted to an appropriate value corresponding to the medium type for each medium type, achieving both suppression of wrinkling and improvement in the transport position accuracy.

Here, the frictional force F is expressed using the winding angle θ by the following equation.

$$F=\mu Nr\theta-Be^{-\mu\theta} \quad \text{[Equation 1]}$$

Here, μ is a friction coefficient between the transport roller 25 and the medium 99, N is a driven load received from the driven roller 26, r is a diameter of the transport roller 25, and B is the back tension. Thus, the frictional force F changes in accordance with the winding angle θ, the driven load N, and the back tension B. In this exemplary embodiment, by adjusting the winding angle θ corresponding to the medium type, it is possible to achieve both suppression of wrinkling in the medium 99 and improvement in the transport position accuracy of the medium 99. At least one of the driven load N and the back tension B may be controlled or may not be controlled. In this exemplary embodiment, an example in which the driven load N and the back tension B are not controlled is described. Therefore, in this exemplary embodiment, a driven load changing unit 90 (refer to FIG. 13) required for changing the driven load N is not necessary.

Adjustment Example of Winding Angle θ

Figure 4:
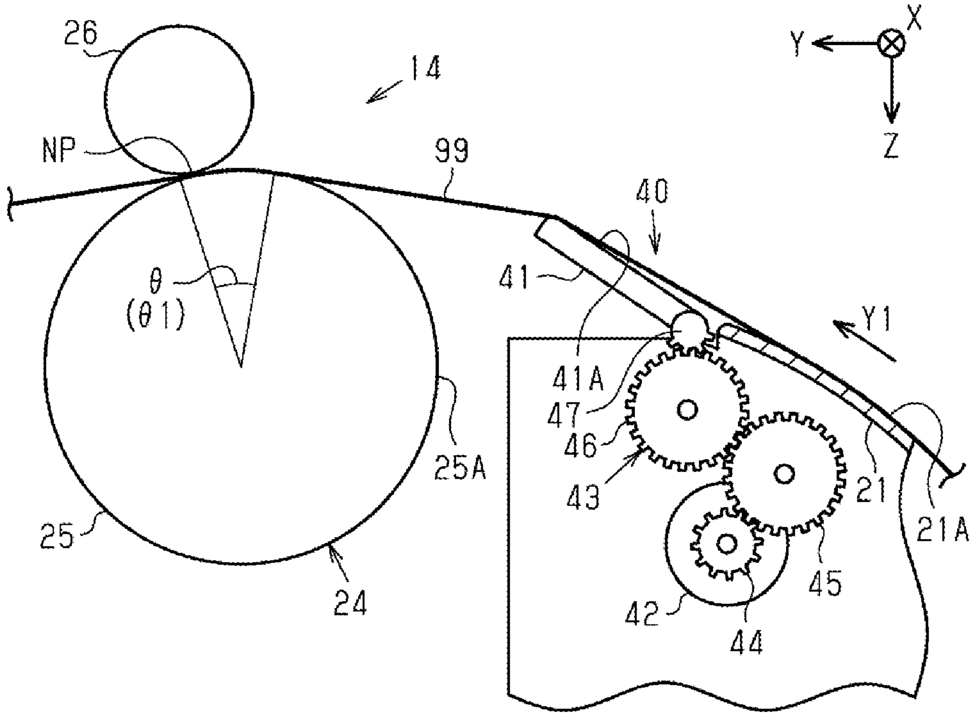
FIG. 4 is a partial perspective view illustrating the winding angle changing unit when a winding angle is changed to a small value.
Figure 5:
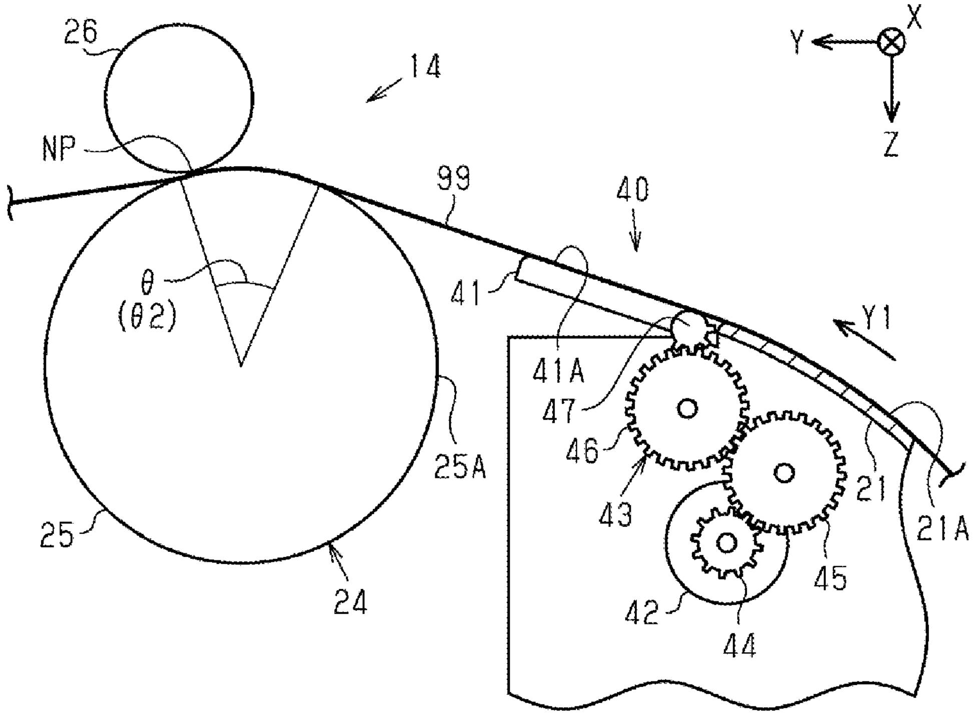
FIG. 5 is a partial perspective view illustrating the winding angle changing unit when the winding angle is changed to a large value.

Next, an adjustment example of the winding angle θ by the winding angle changing unit 40 will be described with reference to FIGS. 4 and 5. FIG. 4 is an example in which the winding angle θ is adjusted to a first winding angle θ1 that is relatively small. FIG. 5 is an example in which the winding angle θ is adjusted to a second winding angle θ2 larger than the first winding angle θ1.

When the motor 42 is driven to rotate in the forward direction, the flap 41 rotates in a first direction in which an opening angle thereof increases. On the other hand, when the motor 42 is driven to rotate in the reverse direction, the flap 41 rotates in a second direction in which the opening angle thereof decreases. Note that the opening angle refers to an acute angle formed by the flap 41 with respect to a horizontal plane. The opening angle is an angle that increases as the flap 41 rotates in the clockwise direction in FIGS. 4 and 5.

As illustrated in FIG. 4, in the case of a medium type that readily wrinkles, the winding angle θ is adjusted to a small value (=θ1). Specifically, the motor 42 is driven to rotate forward, thereby rotating the flap 41 in a direction in which the opening angle increases, as illustrated in FIG. 4. A tip portion of the flap 41 is upwardly displaced, thereby slightly upwardly displacing a guided position of the medium 99 guided by a support face 41A of the flap 41. Thus, a direction in which the medium 99 guided by the flap 41 enters the outer circumferential surface 25A of the transport roller 25 is adjusted. As a result, as illustrated in FIG. 4, the medium 99 is adjusted to the small winding angle θ (θ=θ1). That is, the frictional force F that the medium 99 receives from the outer circumferential surface 25A decreases.

Therefore, the medium 99 of a medium type that readily wrinkles readily slips against the outer circumferential surface 25A of the transport roller 25, thereby eliminating or reducing wrinkling.

On the other hand, as illustrated in FIG. 5, in the case of a medium type that does not readily wrinkle, the winding angle θ is adjusted to a large value (=θ2). Specifically, the motor 42 is driven to rotate in reverse, thereby rotating the flap 41 in a direction in which the opening angle decreases. The tip portion of the flap 41 is downwardly displaced, thereby slightly downwardly displacing the guided position of the medium 99 guided by the support face 41A of the flap 41. Thus, the direction in which the medium 99 enters the outer circumferential surface 25A of the transport roller 25 from the flap 41 is adjusted. As a result, as illustrated in FIG. 5, the medium 99 is adjusted to the large winding angle θ (θ=θ2).

The medium 99 that does not readily wrinkle does not readily slip against the outer circumferential surface 25A of the transport roller 25. Therefore, the transport position accuracy of the medium 99 is improved. As a result, print misalignment of dots formed on the medium 99 by the ejection of liquid such as ink from the ejecting unit 28 is less likely to occur. The printing quality is therefore improved.

Electrical Configuration of Printing Apparatus 11

Next, an electrical configuration of the printing apparatus 11 will be described with reference to FIG. 5.

The printing apparatus 11 includes a control unit 70. A communication unit 71, an operating panel 31, a humidity detector 35, a first rotary encoder 74, and a second rotary encoder 75 are electrically coupled to the control unit 70. The operating panel 31 includes a display unit 32 and an operation unit 33. In a case in which the display unit 32 is a touch panel, the operation unit 33 may be configured by an operation function portion of the touch panel.

The control unit 70 is communicably coupled to a host device 110 via the communication unit 71. The host device 110 includes a display unit 111 and an operation unit 112 operated by a user. The host device 110 includes a print driver (not illustrated) that generates a print job PJ when a print instruction is received from the user via the operation unit 112. The control unit 70 receives data of the print job PJ from the host device 110 via the communication unit 71. Note that the host device 110 is constituted by, for example, a personal computer (PC), a personal digital assistant (PDA), a tablet PC, a smartphone, or a mobile phone.

The humidity detector 35 detects the humidity outside the housing 12. The humidity detector 35 includes a humidity sensor 36 that detects the relative humidity surrounding the printing apparatus 11 or inside the housing 12, and a temperature sensor 37 that detects the temperature outside the housing 12. The humidity detector 35 calculates an absolute humidity AH according to a predetermined calculation formula using information with respect to a relative humidity RH (%) detected by the humidity sensor 36 and a temperature T (° C.) detected by the temperature sensor 37. Note that a configuration may be adopted in which the humidity detector 35 includes only the humidity sensor 36. Further, a configuration may be adopted in which the temperature sensor 37 is included instead of the humidity detector 35. Thus, the detector that detects the environment surrounding the printing apparatus 11 need only detect at least one of absolute humidity, relative humidity, and temperature. Note that the control unit 70 may receive the absolute humidity detection value from the humidity detector 35, or may calculate the absolute humidity information on the basis of the relative humidity information and the temperature information received from the humidity detector 35.

The first rotary encoder 74 detects rotation of the feeding motor 16 constituting the feeding unit 15. That is, the first rotary encoder 74 detects rotation of the roll 101 that rotates by the driving force of the feeding motor 16. The first rotary encoder 74 outputs an encoder signal including several pulses proportional to a rotation amount of the feeding motor 16 to the control unit 70. The control unit 70 detects a feeding amount (feeding volume) of the medium 99 fed from the roll 101 by the feeding unit 15 on the basis of a first encoder signal input from the first rotary encoder 74.

Further, the second rotary encoder 75 detects rotation of the transport motor 72 constituting the transport unit 14. The second rotary encoder 75 outputs an encoder signal including several pulses proportional to a rotation amount of the transport motor 72 to the control unit 70. The control unit 70 detects a transport amount by which the transport roller pair 24 transports the medium 99 on the basis of a second encoder signal input from the second rotary encoder 75.

Further, the feeding motor 16, the transport motor 72, the winding motor 18, the ejecting unit 28, a carriage motor 73, the suction mechanism 30, and the winding angle changing unit 40 are electrically coupled to the control unit 70. The transport motor 72 is a driving source of the transport roller 25 constituting the transport unit 14. The carriage motor 73 is a driving source of the carriage 29. Note that the printing apparatus 11 may be a line printer instead of a serial printer and, in this case, a configuration in which the carriage motor 73 is removed from FIG. 5 is adopted.

The print job PJ that the control unit 70 receives from the host device 110 includes various commands required for printing control, printing condition information specified by the user, and print image data. The control unit 70 controls the various motors 16, 18, 72, and the like on the basis of the printing condition information included in the print job PJ, and controls the ejecting unit 28 on the basis of the print image data to eject liquid from the nozzles 28N, thereby drawing an image with dots formed by droplets landing on the medium 99.

Further, the control unit 70 is configured to include a central processing unit (CPU), a read only memory (ROM), a random access memory (RAM), and a storage (not illustrated). The control unit 70 controls transport of the medium 99 in the printing apparatus 11 and a printing operation of printing information onto the medium 99 by the printing unit 27. Specifically, the control unit 70 is not limited to performing software processing for all processing executed by the control unit 70 itself. For example, the control unit 70 may include a dedicated hardware circuit (for example, application specific integrated circuit: ASIC) configured to perform hardware processing of at least a portion of the processing executed by the control unit 70 itself. That is, the control unit 70 may be configured as circuitry including one or more processors that operate according to a computer program (software), one or more dedicated hardware circuits that execute at least some of the various processing, or a combination thereof. The processor includes a CPU and a storage unit 80 such as a RAM and a ROM, and the storage unit 80 stores program code or instructions configured to cause the CPU to execute processing. The storage unit 80, that is, a computer-readable medium, includes any usable medium that can be accessed by a general purpose or dedicated computer.

Figure 6:
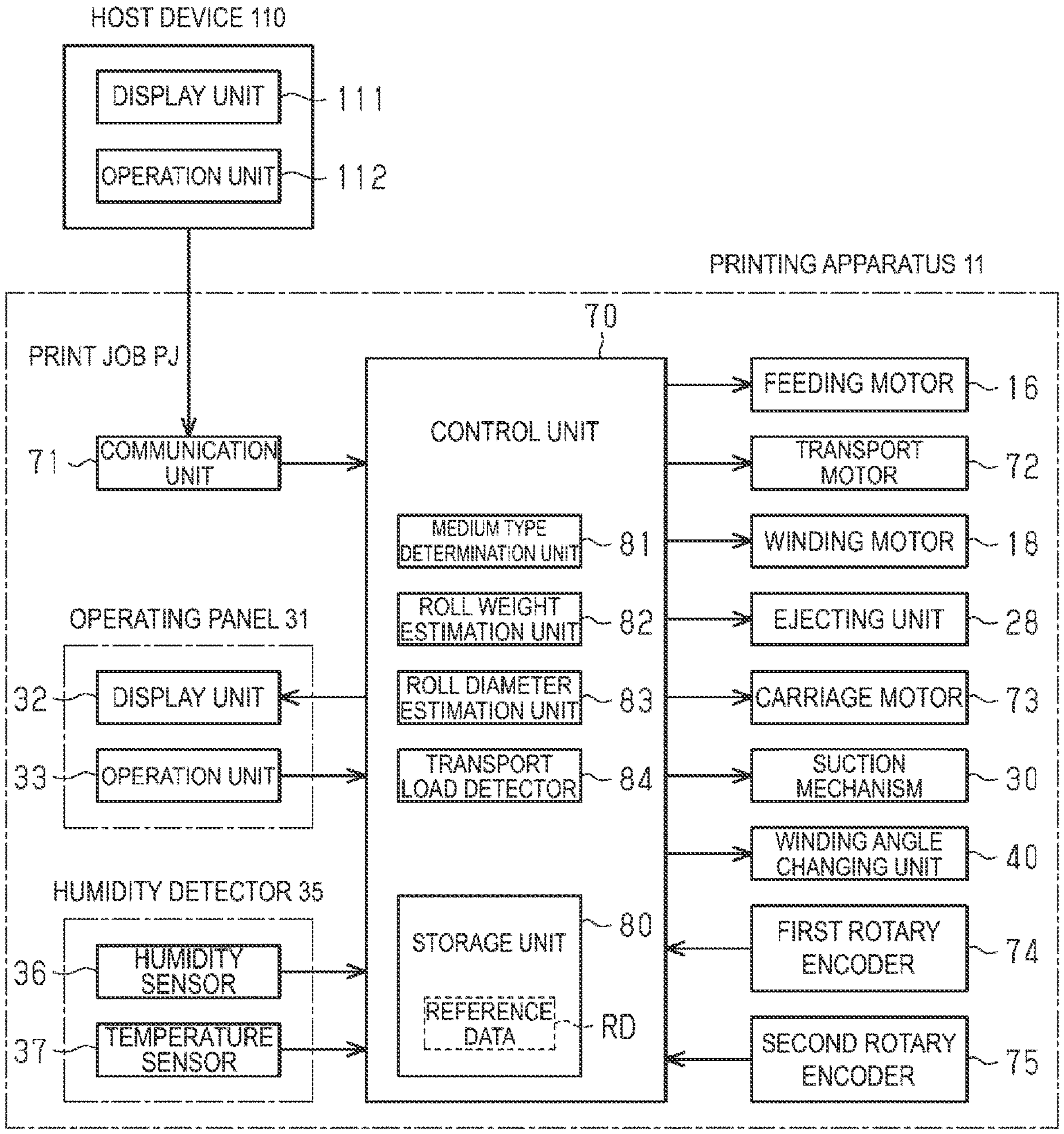
FIG. 6 is a block diagram illustrating an electrical configuration of the printing apparatus.

The CPU of the control unit 70 illustrated in FIG. 6 executes various types of control including printing control by executing a control program stored in the storage unit 80. The storage unit 80 stores this control program as well as reference data RD referenced when the winding angle changing unit 40 determines the winding angle θ.

Further, the control unit 70 includes a medium type determination unit 81 as an example of a determination unit, a roll weight estimation unit 82, a roll diameter estimation unit 83, and a transport load detector 84 as functional portions formed of software configured by the CPU executing a program.

The medium type determination unit 81 determines the medium type that is the type of the medium 99. The medium type determination unit 81 determines the medium type on the basis of medium type information in the printing condition information included in the print job PJ. The medium type includes plain paper, glossy paper, matte paper, and the like. Further, the information with respect to the medium type includes information pertaining to a thickness (basis weight) of the medium 99. Thus, the medium type determination unit 81 may determine the medium type by further distinguishing between thin paper, thick paper, and the like grouped by medium thickness using the thickness information without limiting the medium type to types such as plain paper and glossy paper. Further, the printing apparatus 11 may include an imaging unit such as a camera or an image sensor, and the medium type determination unit 81 may determine the medium type on the basis of an image of the medium 99 captured by the imaging unit. Furthermore, the medium type determination unit 81 may detect the thickness of the medium 99 by a sensor and determine the medium type classified by thickness from the detection result.

By referring to the reference data RD on the basis of the medium type determined by the medium type determination unit 81, the control unit 70 determines the winding angle θ corresponding to the medium type. The control unit 70 drives and controls the winding angle changing unit 40 so that the determined winding angle θ is achieved. The winding angle changing unit 40 changes the winding angle θ in accordance with the medium type. The control unit 70 adjusts the frictional force F of the medium 99 with respect to the transport roller 25 by adjusting the winding angle θ. With adjustment of the frictional force F, the likelihood of the medium 99 slipping against the transport roller 25 is adjusted in accordance with the medium type.

The roll weight estimation unit 82 estimates a roll weight that is a weight of the roll 101 supported by the feeding unit 15. The user operates the operation units 33, 112, thereby inputting an initial roll diameter of the roll 101. Further, a rotation amount (feeding length) of the roll 101 is acquired on the basis of the encoder signal from the first rotary encoder 74 that detects the rotation of the feeding motor 16. The roll weight estimation unit 82 specifies the weight per unit length of the medium 99 from information such as the medium type, the medium size, and the basis weight. The roll weight estimation unit 82 calculates the roll weight by subtracting the product of the cumulative feed length of the medium 99 determined from the current diameter and the rotation amount of the roll 101 and the weight per unit length of the medium 99 from the initial weight based on the initial roll diameter. The operator may input the initial weight by operating the operation units 33, 112.

The control unit 70 may control the winding angle changing unit 40 so that the winding angle θ corresponds to the roll weight. The winding angle changing unit 40 changes the winding angle θ in accordance with the roll weight. In this case, the control unit 70 may control the winding angle changing unit 40 so that the winding angle θ is larger for a higher roll weight. In other words, the control unit 70 controls the winding angle changing unit 40 so that the winding angle θ decreases as the roll weight decreases. This is because the back tension B readily increases while the roll weight is high and decreases as the roll weight decreases. A high back tension B has a wrinkle suppression effect, but promotes slipping of the medium 99 against the transport roller 25, decreasing the transport position accuracy. Therefore, the winding angle θ may be adjusted in accordance with the roll weight affecting the back tension B.

The roll diameter estimation unit 83 estimates the roll diameter that is a diameter of the roll 101 supported by the feeding unit 15. The roll diameter estimation unit 83 acquires a rotation amount (feeding amount) of the roll 101 by counting the number of pulse edges of the encoder signal input from the first rotary encoder 74. The roll diameter estimation unit 83 estimates the current roll diameter using the initial roll diameter, the feeding length, and the medium thickness. Note that the roll diameter estimation unit 83 may include a sensor that measures the diameter of the roll 101 mounted onto the feeding unit 15. In this case, the roll diameter estimation unit 83 may estimate the roll diameter on the basis of the detection value of the sensor.

The control unit 70 may control the winding angle changing unit 40 so that the winding angle θ is an angle corresponding to the roll diameter. The winding angle changing unit 40 changes the winding angle θ in accordance with the roll diameter. Here, a moment of inertia depends on an inertia and a roll diameter of a rotation system of the roll 101, the feeding unit 15, and the like. The greater the moment of inertia, the greater the rotation start delay of the roll 101. The rotation start delay of the roll 101 with respect to the transport start timing of the transport roller pair 25 increases the back tension B. Therefore, the control unit 70 may adjust the winding angle θ in accordance with the roll diameter. For example, the control unit 70 may control the winding angle changing unit 40 so that the winding angle θ is larger for a larger roll diameter.

The transport load detector 84 detects a transport load when the transport roller pair 24 transports the medium 99. This transport load is detected as a motor load received by the transport motor 72 that drives the transport roller 25. For example, the transport load detection unit 84 detects, as the transport load, a current value (motor current value) at which the control unit 70 drives the transport motor 72. The control unit 70 performs feedback control on the current value of the transport motor 72 so that the transport roller 25 can transport the medium 99 at a target transport velocity. The control unit stores transport velocity profile data indicating a correspondence relationship between a transport position from a transport start position of the medium 99 and the target velocity. The control unit 70 controls the current value of the transport motor 72 in order to perform feedback control for bringing the actual transport velocity of the medium 99 acquired on the basis of the encoder signal from the second rotary encoder 75 close to the target transport velocity. The transport load detector 84 detects the current value of the transport motor 72 as the transport load, for example.

The control unit 70 controls the transport motor 72 on the basis of the transport load detected by the transport load detector 84. With such control, the feedback control described above may be performed. That is, the control unit 70 may perform feedback control in which the transport motor 72 is controlled so that the actual transport load detected by the transport load detector 84 approaches the target transport load. Furthermore, the control unit 70 may control the winding angle θ of the winding angle changing unit 40 on the basis of the actual transport load detected by the transport load detector 84. In this exemplary embodiment, when the transport load is large, the control unit 70 may control the winding angle θ to be large. For example, the transport load increases when the back tension B is high, and thus the transport position accuracy may be improved by increasing the winding angle θ to increase the frictional force F. Note that, in a case in which the winding angle θ is adjusted in accordance with at least one of the roll weight and the roll diameter, the degree of adjustment of the winding angle θ may be changed in accordance with the parameter of the transport load.

Note that, after the power is turned on and the medium 99 is set in the transport unit 14, upon receipt of an instruction to start reel measurement, the control unit 70 may execute reel measurement. In the reel measurement, a winding load when the medium 99 is wound by the winding unit 17 may be measured in a state without tension applied to the medium 99. Then, the control unit 70 may control the winding motor 18 at a target rotational torque obtained by adding a torque conversion value of the target tension corresponding to the medium type and the medium width to a torque conversion value of the winding load. In this way, a front tension may be applied to a portion of the medium 99 between the transport unit 14 and the roll 102 on the winding side of the medium 99 during winding.

Further, the control unit 70 may apply the back tension to a portion of the medium 99 between the roll 101 and the transport unit 14 by controlling a transport amount by which the transport unit 14 transports the medium 99 and the feeding amount by which the feeding unit 15 feeds the medium 99 from the roll 101. Specifically, the control unit 70 may apply the back tension to the medium 99 by controlling the feeding amount so as to be slightly less than the transport amount, and transporting the medium 99 while causing slight slippage against the transport roller 25.

When the humidity is high, the medium 99 absorbs moisture in the atmosphere, and thus increases in moisture content. When the moisture content increases, paper fibers absorb the moisture, the medium 99 becomes soft, and wrinkling readily occurs. Further, the medium 99 after adherence of a liquid such as ink increases in total moisture amount. The medium 99 swells with the ink and then shrinks as the ink dries. As a result, due to an increase in an amount of expansion and contraction when the medium 99 swells and contracts, the likelihood of wrinkling increases. Then, when a contraction amount differs between a portion before printing and a portion after printing, wrinkling generated by swelling and contraction of the medium 99 in the printing region, for example, may propagate upstream of the transport roller pair 24. Thus, high humidity readily causes wrinkling in the medium 99. Therefore, in this exemplary embodiment, the humidity surrounding the printing apparatus 11 is detected, and the likelihood of wrinkling of the medium 99 due to humidity is managed.

Then, the control unit 70 controls the winding angle changing unit 40 on the basis of information with respect to the likelihood of wrinkling. That is, the control unit 70 determines the winding angle θ in accordance with the detected humidity. The winding angle changing unit 40 adjusts the winding angle θ to the angle corresponding to the humidity.

Here, when the winding angle changing unit 40 increases the winding angle θ, the frictional force F that the medium 99 receives from the outer circumferential surface 25A of the transport roller 25 increases according to Equation 1.

Next, the reference data RD will be described with reference to FIG. 7. The reference data RD is, for example, table data indicating a correspondence relationship between the medium type and the winding angle θ. The winding angle θ is set for each medium type. In the example shown in FIG. 7, a medium A is associated with a winding angle θ1, a medium B is associated with a winding angle θ2, and a medium C is associated with a winding angle θ3. The medium types A, B, C, . . . are, for example, plain paper, photographic paper, glossy paper, matte paper, and high-quality paper. The winding angles θ1, θ2, θ3, . . . determine, for example, the winding angle θ to be changed by the winding angle changing unit 40.

The likelihood of wrinkling depends on the thickness (basis weight), rigidity (Young's modulus), environment, and the like of the medium 99.

FIG. 8 is a graph showing a relationship between the likelihood of wrinkling and the winding angle θ. The reference data RD is created so as to satisfy the relationship shown in this graph. In the graph shown in FIG. 8, the horizontal axis represents the likelihood of wrinkling and the vertical axis represents the winding angle θ.

As shown in FIG. 8, the medium 99 differs in the likelihood of wrinkling depending on the medium type. Therefore, a larger winding angle θ within a winding angle θ range capable of wrinkle suppression may be set for each medium type. When the winding angle θ decreases, the frictional force F that the medium 99 receives from the outer circumferential surface 25A of the transport roller 25 decreases. That is, when the winding angle θ decreases, the medium 99 readily slips against the outer circumferential surface 25A of the transport roller 25. The wrinkling that occurs in the portion of the medium 99 upstream of the transport roller 25 in the transport direction Y1 is readily eliminated or reduced by the medium 99 slipping against the outer circumferential surface of the transport roller 25.

On the other hand, when the medium 99 readily slips against the transport roller 25, the transport position accuracy when the medium 99 is transported to the printing position decreases. When the winding angle θ increases, the frictional force F that the medium 99 receives from the outer circumferential surface 25A of the transport roller 25 increases. As a result, the transport position accuracy when the medium 99 is transported to the printing position increases. In this way, in order to suppress wrinkling, the winding angle θ is decreased, causing the medium 99 to readily slip against the transport roller 25. On the other hand, to increase the transport position accuracy, the winding angle θ is increased, causing the medium 99 to not readily slip against the transport roller 25. Thus, there is a trade-off relationship between wrinkling countermeasures and transport position accuracy countermeasures.

In this exemplary embodiment, as understood from a graph line L1 shown in FIG. 8, a large winding angle θ is set for a medium type having a high likelihood of wrinkling, and a small winding angle θ is set for a medium type having a low likelihood of wrinkling. As a result, both an improvement in the wrinkle suppression effect and the transport position accuracy of the medium 99 are achieved.

Next, the control for changing the winding angle θ in accordance with the roll diameter and the roll weight will be described with reference to FIGS. 9 and 10. FIG. 9 is a graph showing a relationship between the roll weight and the winding angle θ. Further, FIG. 10 is a graph showing a relationship between the roll diameter and the winding angle θ.

As indicated by a graph line L2 in FIG. 9, the winding angle θ may be set to a larger value for a higher roll weight. Initially, when the roll 101 is newly replaced, the roll weight is the highest. Then, as printing proceeds with the feeding of the medium 99 from the roll 101, the roll weight and the roll diameter of the roll 101 gradually decrease. The roll weight acts to increase the back tension on the medium 99. Therefore, by the frictional force caused by the winding angle θ, a reduction in the transport position accuracy by the back tension is improved. Thus, the winding angle θ for ensuring the transport position accuracy increases while the roll weight is high and is adjusted to a lower value as the roll weight decreases.

As indicated by a graph line L3 in FIG. 10, the winding angle θ may be set to a larger value for a larger roll diameter. Initially, when the roll 101 is newly replaced, the roll diameter is the largest. Then, as printing proceeds with the feeding of the medium 99 from the roll 101, the roll diameter gradually decreases. The rotation start delay of the roll 101 increases in likelihood with larger roll diameters. The rotation start delay of the roll 101 increases the back tension. That is, because the feeding amount of the medium 99 decreases to a greater degree than the transport amount of the medium 99 by the transport roller 25 during the delay occurrence period, the rotation start delay of the roll 101 acts to increase the back tension. Therefore, the winding angle changing unit 40 increases the winding angle θ relative to the increase in back tension caused by the rotation start delay of the roll 101. In other words, as indicated by the graph line L3 in FIG. 10, the control unit 70 controls the winding angle changing unit 40, decreasing the winding angle θ as the roll diameter decreases.

An angular acceleration of the roll 101 depends on the inertia (moment of inertia) of the rotation system of the roll 101 and the feeding unit 15. This inertia depends on the roll diameter (radius), and thus the angular acceleration depends on the roll diameter. That is, the angular acceleration at the start of roll rotation is lower for larger roll diameters. Therefore, while the roll diameter is large, the winding angle changing unit 40 increases the winding angle θ in consideration of the tension generated as a result of the rotation start delay. Then, as the roll diameter decreases, the tension caused by the rotation start delay also decreases, and thus the winding angle changing unit 40 gradually decreases the winding angle θ. In this way, the control unit 70 controls the winding angle changing unit 40 so that the winding angle θ becomes an angle corresponding to the roll diameter.

The control unit 70 according to this exemplary embodiment does not perform back tension control (BTC) in which the feeding motor 16 is made to adjust the back tension in accordance with the roll weight and the roll diameter of the roll 101. That is, the control unit 70 controls the feeding amount and a feeding velocity of the feeding unit 15 in accordance with the transport amount and a transport velocity of the transport unit 14 so as not to generate excessive tension, but does not perform BTC for adjusting the tension to the target value. The control unit 70 controls a driving velocity and a driving amount of the feeding motor 16 in accordance with changes in the roll weight and the roll diameter so that the feeding velocity and the feeding amount from the roll 101 become respective target values (target velocity and target amount). Therefore, the tension of the medium 99 fed from the feeding unit 15 varies within a certain range.

Actions of Exemplary Embodiment

Next, actions of the printing apparatus 11 will be described.

For example, the user sets the medium 99 in the transport unit 14 by mounting a new roll 101 onto the feeding unit 15 and nipping the medium 99 of a predetermined length drawn out from the roll 101 between the transport roller pair 24.

The user operates the operation unit 112 of the host device 110 or the operation unit 33 of the printing apparatus 11 to input the printing condition information. The printing condition information includes information such as the medium size, the medium type, a printing color (color/monochrome), a printing count (number of print layers), and a printing resolution.

The user operates the operation units 33, 112 to provide instructions related to the print job PJ. A print job PJ package includes print condition information, print image data, and the like. The control unit 70 controls the feeding unit 15, the transport unit 14, the winding unit 17, and the printing unit 27 on the basis of the commands included in the print job PJ, thereby printing characters or images based on the print image data onto the medium 99.

Prior to this printing, the control unit 70 determines the medium type. Specifically, the medium type determination unit 81 may, on the basis of the printing condition information, determine the medium type used when the winding angle θ is determined. Alternatively, the medium type input by the user operating the operation units 33, 112 may be used. The medium types may be general medium types classified by paper quality, such as plain paper or photographic paper, or may be medium types further classified by thickness (basis weight) or the like for winding angle control.

By referring to the reference data RD on the basis of the medium type, the control unit 70 determines the winding angle θ corresponding to the medium type. The medium type is one parameter for determining the likelihood of wrinkling. Further, humidity is another parameter for determining the likelihood of wrinkling. The control unit 70 adjusts the winding angle θ in accordance with the humidity. Further, the winding angle θ acts to adjust the effects of the back tension B. When the back tension B becomes excessively high, the medium 99 becomes excessively slippery against the outer circumferential surface 25A of the transport roller 25, reducing the transport position accuracy of the medium 99. The control unit 70 may therefore adjust the winding angle θ in accordance with the roll weight and the roll diameter. In this way, the winding angle θ is determined in accordance with the medium type. Furthermore, the winding angle θ may be determined to be a value corresponding to environmental information, such as humidity and temperature, roll weight, roll diameter, and the like.

Next, the control unit 70 adjusts the winding angle θ to the determined angle by controlling the winding angle changing unit 40. A relatively small winding angle θ (=θ1) is applied to a medium type having a high likelihood of wrinkling, and a relatively large winding angle θ (=θ2) is applied to a medium type having a low likelihood of wrinkling. That is, a smaller winding angle θ is applied to a first medium type having a high likelihood of wrinkling than to a second medium type having a likelihood of wrinkling lower than that of the first medium type.

Specifically, the control unit 70 adjusts the flap 41 to the opening angle illustrated in FIG. 4 by controlling the motor 42. This adjusts the direction in which the medium 99 enters the outer circumferential surface 25A. As a result, as illustrated in FIG. 4, the medium 99 is adjusted to the small winding angle θ (=θ1). Further, the control unit 70 adjusts the flap 41 to the opening angle illustrated in FIG. 5 by controlling the motor 42. This adjusts the direction in which the medium 99 enters the outer circumferential surface 25A from the flap 41. As a result, as illustrated in FIG. 5, the medium 99 is adjusted to a large winding angle θ (θ=θ2).

Thus, the medium 99 comes into contact with the outer circumferential surface 25A at a winding angle θ close to the minimum effective for eliminating and reducing wrinkling for each medium type. In some cases, the longitudinal wrinkling extending in the transport direction Y1, or the like, may occur in a portion of the medium 99 upstream of the transport roller pair 24. In this case, the medium 99 receiving the force of the back tension B slips against the transport roller pair 24, spreading in the width direction X, eliminating or reducing the wrinkling. Therefore, for a medium type that readily wrinkles, the winding angle θ is reduced to reduce the frictional force F, thereby causing the medium 99 to slip more readily against the transport roller pair 24. On the other hand, for a medium type that does not readily wrinkle, the winding angle θ is increased to increase the frictional force F. Accordingly, the medium 99 does not readily slip against the transport roller pair 24, ensuring the transport position accuracy. As a result, in the printing apparatus 11 of this exemplary embodiment, regardless of the medium type, it is possible to achieve both the effect of suppressing wrinkling in the portion of the medium 99 before reaching the transport roller pair 24 and the effect of ensuring the transport position accuracy at which the medium 99 is transported to the printing position.

For example, in a case in which the winding angle θ is constant regardless of the medium type, an intermediate winding angle θ capable of handling both a medium type having a high likelihood of wrinkling and a medium type having a low likelihood of wrinkling is set. In this case, in the medium 99 of the medium type having a high likelihood of wrinkling, the excessively large winding angle θ ensures transport position accuracy, but significantly reduces the wrinkle suppression effect. In this case, there is a possibility of an increase in printing defects caused by creases or the like. On the other hand, in the medium 99 of the medium type having a low likelihood of wrinkling, wrinkling is unlikely, but the excessively small winding angle θ may unnecessarily reduce the transport position accuracy. In this case, there is a possibility of an increase in printing defects due to a printing position shift or the like.

In response, in this exemplary embodiment, the winding angle θ is adjusted to the small value illustrated in FIG. 4 for a medium type that readily wrinkles, and to the large value illustrated in FIG. 5 for a medium type that does not readily wrinkle. In this way, the winding angle θ is adjusted to an appropriate value corresponding to the medium type classified according to likelihood of wrinkling.

Further, as printing proceeds, the roll weight and the roll diameter of the roll 101 gradually decrease. The control unit 70 may adjust the winding angle θ in accordance with at least one of the roll weight and the roll diameter. While the roll weight is high, the back tension B is likely to be high. When the back tension B is high, the medium 99 readily slips against the transport roller pair 24, and thus the winding angle θ is increased to increase the frictional force F between the medium 99 and the transport roller 25.

Further, when the roll diameter is large, the back tension B is likely to be high due to the rotation start delay of the roll 101. Therefore, when the roll diameter is large, the winding angle θ is increased to increase the frictional force F between the medium 99 and the transport roller 25. In this way, even when the roll weight and the roll diameter change slightly as printing proceeds, the winding angle θ changes in accordance with this change. Then, even when the weight or the diameter of the roll 101 changes during printing, the winding angle θ is adjusted to an appropriate value, thereby reducing both printing defects caused by wrinkling and printing defects caused by print misalignment.

Further, the control unit 70 may perform feedback control to control the winding angle θ of the winding angle changing unit 40 in accordance with the transport load of the transport motor 72 detected by the transport load detector 84. That is, when the detected transport load is large, the control unit 70 increases the frictional force F between the medium 99 and the transport roller 25 by changing the winding angle θ to a large value.

In the printing apparatus 11 according to this exemplary embodiment, the driving source such as the motor 42 and the power transmission mechanism 43 of the winding angle changing unit 40 are disposed in an apparatus frame that partially forms the support portion 21. Then, only the flap 41, which is a member for changing the direction in which the medium 99 enters the outer circumferential surface 25A to adjust the winding angle θ, is disposed in a rotatable state in the vicinity of a downstream end portion of the support portion 21. This makes the printing apparatus 11 less likely to increase in size despite the provision of the winding angle changing unit 40.

Effects of Exemplary Embodiment

According to the first exemplary embodiment, the following effects are achieved.

(1) The printing apparatus 11 includes the winding angle changing unit 40 provided upstream of the transport roller 25 in the transport direction Y1 of the printing medium 99 and configured to change the winding angle θ at which the printing medium 99 comes into contact with the outer circumferential surface 25A of the transport roller 25. According to this configuration, it is possible to adjust the winding angle θ at which the printing medium 99 comes into contact with the outer circumferential surface 25A of the transport roller 25. Thus, both the effect of suppressing wrinkling in the printing medium 99 before compression by the transport roller 25 and ensuring the transport position accuracy of the printing medium 99 transported by the transport roller 25 are readily achieved. This makes it possible to suppress printing defects caused by wrinkling and printing defects caused by a reduction in transport position accuracy.

(2) The printing apparatus 11 includes the feeding unit 15 configured to support the roll 101 obtained by winding the medium 99 into a roll shape at a position upstream of the transport roller 25 in the transport direction Y1, and feed the printing medium 99 from the roll 101. According to this configuration, in a configuration in which the transport roller 25 transports the printing medium 99 long in length and fed from the roll 101 by the feeding unit 15, both the effect of suppressing wrinkling in the printing medium 99 before compression by the transport roller 25 and ensuring the transport position accuracy of the printing medium 99 transported by the transport roller 25 are readily achieved.

(3) The printing apparatus 11 includes the support portion 21 provided upstream of the transport roller 25 in the transport direction Y1 and configured to support the printing medium 99. According to this configuration, it is possible to support a portion of the printing medium 99 fed from the feeding unit 15 before arrival at the transport roller 25 by the support portion 21. With the printing medium 99 supported by the support portion 21, wrinkling is less likely to occur.

(4) The winding angle changing unit 40 includes the flap 41 configured to change in angle with respect to the support portion 21 at a portion of the support portion 21 on the transport roller 25 side. According to this configuration, the angle of the flap 41 is changed to adjust the winding angle θ at which the printing medium 99 comes into contact with the outer circumferential surface 25A of the transport roller 25. With just the flap 41 configured to change in angle with respect to the support portion 21 being required, the printing apparatus 11 is less likely to increase in size.

(5) The medium type determination unit 81 is included as an example of a determination unit configured to determine the type of the printing medium 99. The winding angle changing unit 40 is configured to change the winding angle θ in accordance with the type of the printing medium 99. According to this configuration, it is possible to adjust the winding angle θ to an appropriate value corresponding to the type of the printing medium 99. Therefore, both the effect of suppressing wrinkling in the printing medium 99 and ensuring the transport position accuracy of the printing medium 99 transported by the transport roller 25 are readily achieved.

(6) The control unit 70 is configured to control the feeding unit 15 to perform tension control for adjusting the tension in the printing medium 99 fed from the roll 101. According to this configuration, by the tension control for adjusting the tension of the printing medium 99 fed from the roll 101, wrinkling can be effectively suppressed and the transport position accuracy is readily ensured.

(7) The winding angle changing unit 40 is configured to change the winding angle θ in accordance with the weight of the roll 101 estimated by the roll weight estimation unit 82. According to this configuration, it is possible to change the winding angle θ in accordance with the weight of the roll 101, thereby readily achieving both the effect of suppressing wrinkling and ensuring the transport position accuracy.

(8) The winding angle changing unit 40 is configured to change the winding angle θ in accordance with the diameter of the roll 101 estimated by the roll diameter estimation unit 83. According to this configuration, it is possible to change the winding angle θ in accordance with the diameter of the roll 101, thereby readily achieving both the effect of suppressing wrinkling and ensuring of the transport position accuracy.

Second Exemplary Embodiment

Figure 11:
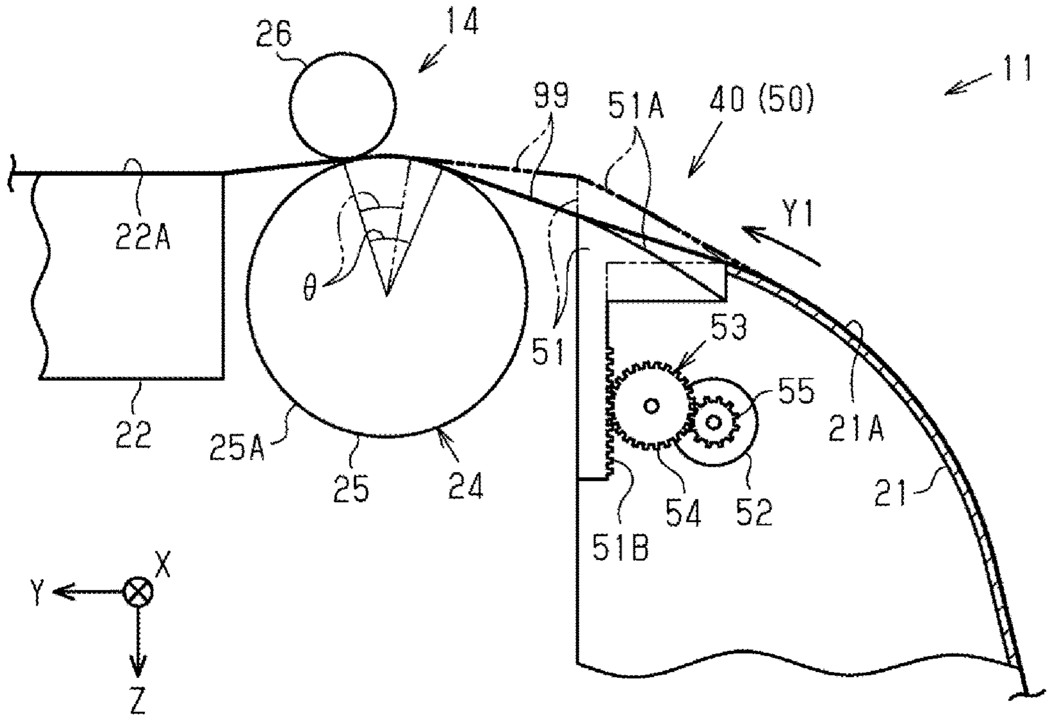
FIG. 11 is a schematic side sectional view illustrating the winding angle changing unit according to a second exemplary embodiment.

Next, a configuration of the winding angle changing unit 40 according to a second exemplary embodiment will be described with reference to FIG. 11. The winding angle changing unit 40 illustrated in FIG. 11 includes a variable member 51 that is an example of a member serving as an exiting portion configured to change in position at a portion of the support portion 21 on the transport roller 25 side. The winding angle changing unit 40 is an exiting portion changing mechanism 50 in which the variable member 51 constituting the exiting portion of the support portion 21 is configured to change in position. The exiting portion changing mechanism 50 includes the variable member 51 of a rising and lowering type as an example of a member serving as the exiting portion, a motor 52 that is a driving source, and a power transmission mechanism 53 that transmits the driving force of the motor 52 to the variable member 51. The variable member 51 includes, at an upper portion, a guide surface 51A that guides the medium 99. The power transmission mechanism 53 is constituted by, for example, a rack-and-pinion mechanism including a pinion 54 that meshes with a toothed drive gear 55 fixed to an output shaft of the motor 52, and a rack 51B that meshes with the pinion 54. The rack 51B is formed at a base portion that is a portion on a side opposite to the guide surface 51A of the variable member.

When the motor 52 is driven in the forward direction, the variable member 51 rises. Then the guide surface 51A rises, changing the direction in which the medium 99 enters the outer peripheral surface 25A. As a result, the winding angle θ is adjusted to a small value. In the case of a medium type that readily wrinkles, the control unit 70 controls the motor 52 to adjust the winding angle θ to a small value according to the medium type.

On the other hand, when the motor 52 is driven in the reverse direction, the variable member 51 lowers. Then the guide surface 51A lowers, changing the direction in which the medium 99 enters the outer peripheral surface 25A. As a result, the winding angle θ is adjusted to a large value. In the case of a medium type that does not readily wrinkle, the control unit 70 controls the motor 52 to adjust the winding angle θ to a large value according to the medium type.

Thus, the exiting portion changing mechanism 50, in which the exiting portion of the support portion 21 supporting the medium 99 upstream of the transport roller 25 is configured to change in position, can also be used to adjust the winding angle θ in accordance with the degree of likelihood of wrinkling.

According to the second exemplary embodiment, the following effects are achieved.

(9) The winding angle changing unit 40 includes the variable member 51 as an example of the exiting portion configured to change in position at a portion of the support portion 21 on the transport roller 25 side. According to this configuration, the position of the variable member 51 that is a portion (exiting portion) of the support portion 21 on the transport unit side is changed to adjust the winding angle θ at which the printing medium 99 comes into contact with the outer circumferential surface 25A of the transport roller 25. With just the variable member 51 of the support portion 21 needing to be repositionably provided, the printing apparatus 11 is less likely to increase in size.

Third Exemplary Embodiment

Figure 12:
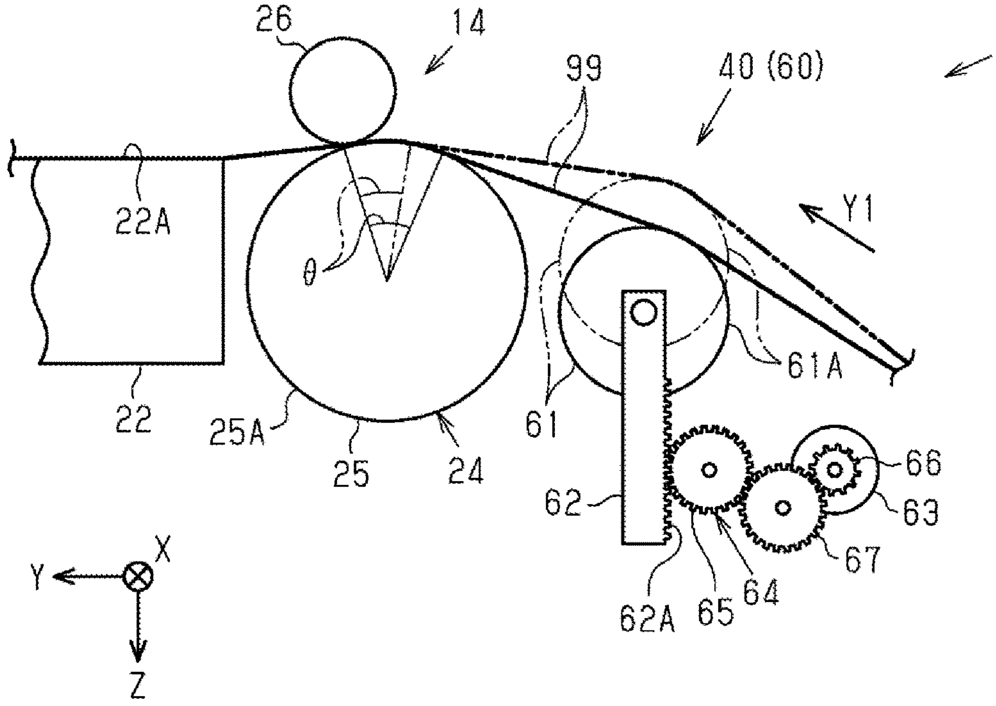
FIG. 12 is a schematic side sectional view illustrating the winding angle changing unit according to a third exemplary embodiment.

Next, the winding angle changing unit 40 according to a third exemplary embodiment will be described with reference to FIG. 12. The winding angle changing unit 40 illustrated in FIG. 12 is configured to change the position of the support portion 21. Specifically, the winding angle changing unit 40 is a roller changing mechanism 60 that includes a supporting roller 61 as an example of a roller that functions as the support portion 21, and is configured to change the position of the supporting roller 61 in its entirety. As described above, in this exemplary embodiment, the support portion 21 is a roller, and the winding angle changing unit 40 is configured to change the position of the supporting roller 61 that is an example of the roller.

The roller changing mechanism 60 includes the supporting roller 61, a motor 63 that is a driving source, and a power transmission mechanism 64 that transmits a driving force of the motor 63 to the supporting roller 61. An outer circumferential surface of the supporting roller 61 serves as a guide surface 61A that supports the medium 99. The supporting roller 61 is supported by a supporting member 62 of a slide type, and thus can change in position. Note that the supporting roller 61 may be rotatably supported with respect to the supporting member 62 or may be fixed in a non-rotatable state.

The power transmission mechanism 64 is constituted by, for example, a rack-and-pinion mechanism including a pinion 65 that meshes with a toothed gear 67 that further meshes with a toothed drive gear 66 fixed to an output shaft of the motor 63, and a rack 62A that meshes with the pinion 65. The rack 62A is formed at a base portion of the supporting member 62 on a side opposite to the supporting roller 61.

In the case of a medium type that readily wrinkles, the control unit 70 controls the motor 63 to adjust the winding angle θ to a small value according to the medium type. Specifically, when the motor 63 is driven in the forward direction, the supporting roller 61 rises. Then, the guide surface 61A rises, changing the direction in which the medium 99 supported by the guide surface 61A enters the outer peripheral surface 25A. As a result, the winding angle θ is adjusted to a small value.

On the other hand, in the case of a medium type that does not readily wrinkle, the control unit 70 controls the motor 63 to adjust the winding angle θ to a large value according to the medium type. Specifically, when the motor 63 is driven in the reverse direction, the supporting roller 61 is lowered. Then, the guide surface 61A lowers, changing the direction in which the medium 99 supported by the guide surface 61A enters the outer peripheral surface 25A. As a result, the winding angle θ is adjusted to a large value.

Thus, the roller changing mechanism 60, in which the supporting roller 61 constituting the support portion 21 supporting the medium 99 upstream of the transport roller 25 is configured to change in position, can also be used to adjust the winding angle θ to an appropriate value according to the medium type.

According to the third exemplary embodiment, the following effects are achieved.

(10) The winding angle changing unit 40 is configured to change the position of the support portion 21. According to this configuration, the position of the support portion 21 is changed to adjust the winding angle θ at which the printing medium 99 comes into contact with the outer circumferential surface 25A of the transport roller 25. With just the support portion 21 itself needing to be repositionably provided, a simple configuration with a small number of parts is all that is required, making the printing apparatus 11 less likely to increase in size.

(11) The support portion 21 is the supporting roller 61 that is an example of a roller. The winding angle changing unit 40 is configured to change the position of the supporting roller 61. According to this configuration, the position of the roller also serving as the support portion 21 is changed to adjust the winding angle θ at which the printing medium 99 comes into contact with the outer circumferential surface 25A of the transport roller 25. With just the supporting roller 61 also serving as the support portion 21 needing to be repositionably provided, a simple configuration with a small number of parts is all that is required, making the printing apparatus 11 less likely to increase in size.

Fourth Exemplary Embodiment

Figure 13:
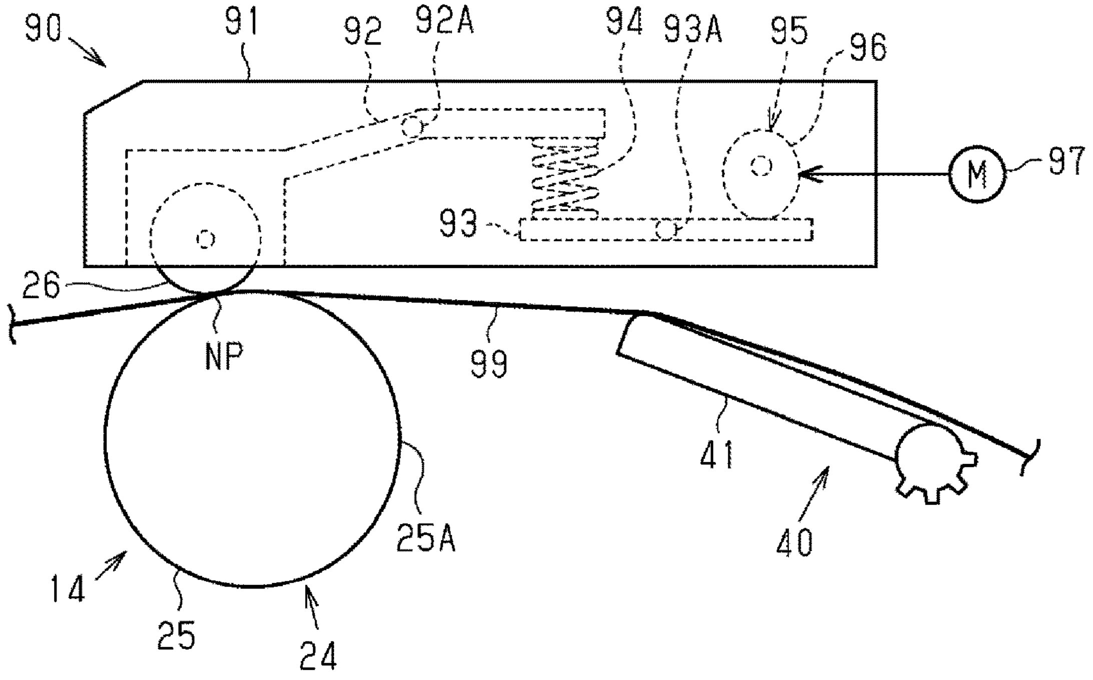
FIG. 13 is a schematic side cross-sectional view illustrating a driven load changing unit and the winding angle changing unit according to a fourth embodiment.

Next, a fourth exemplary embodiment will be described with reference to FIG. 13. This exemplary embodiment is a configuration in which the driven load N is changed. The driven load N is a load that the medium 99 receives from the driven roller 26. The printing apparatus 11 illustrated in FIG. 13 includes the driven load changing unit 90 that supports the driven roller 26. The driven load changing unit 90 is configured to change the driven load N which is a load that the printing medium 99 nipped by the transport roller 25 and the driven roller 26 at the nipping position NP receives from the driven roller 26. The driven load changing unit 90 is controlled by the control unit 70. Specifically, as illustrated in FIG. 13, the driven load changing unit 90 includes a holding unit 91 and a support lever 92 swingably supported by the holding unit 91 via a support shaft 92A. The driven roller 26 is rotatably supported at a tip portion of the support lever 92. An elastic member 94 such as a spring is interposed between a base portion of the support lever 92 opposite to the tip portion at which the driven roller 26 is supported and a tip portion of an adjustment lever 93 swingably supported via a support shaft 93A. When the adjustment lever 93 is at a posture angle illustrated in FIG. 13, the elastic member 94 is compressed to a predetermined length, and a biasing force pressing against the outer peripheral surface 25A of the transport roller pair 24 is applied to the driven roller 26 in accordance with the compressed length of the elastic member 94. A cam mechanism 95 is provided at a base portion of the adjustment lever 93, which is positioned on a side opposite to the tip portion supporting the elastic member 94, and forms a portion of this base portion. The cam mechanism 95 includes a cam 96 including the base portion of the adjustment lever 93 as a cam follower. The cam 96 is formed of, for example, an eccentric cam. The cam 96 rotates by a driving force of a motor 97. The motor 97 is controlled by the control unit 70. Note that the cam 96 is not limited to a rotary-type cam such as the eccentric cam, and may be a cam constituting a cam mechanism of another type as long as capable of changing the driven load N.

As shown in Equation 1 described above, the frictional force F increases as the driven load N increases. In the example shown in FIG. 13, the elastic member 94 is in the most compressed state. At this time, the medium 99 receives a maximum driven load N (=Nmax) from the driven roller 26. When the motor 97 is driven to rotate the cam 96 from the state illustrated in FIG. 13, the adjustment lever 93 rotates about the support shaft 93A in the counterclockwise direction in FIG. 13, extending the elastic member 94. As a result, the pressing force with which the driven roller 26 presses the medium 99 increases. Then, the driven load N that the printing medium 99 receives from the driven roller

26 decreases. Note that the driven load N corresponds to a drag force that the medium 99 receives from the outer circumferential surface 25A.

In the case of a medium type that readily wrinkles, the control unit 70 controls the motor 97 to adjust the winding angle θ to a small value according to the medium type, thereby adjusting the driving load N to a smaller value. With the small driven load N, the frictional force F decreases. On the other hand, in the case of a medium type that does not readily wrinkle, the control unit 70 controls the motor 97 to adjust the winding angle θ to a large value according to the medium type, thereby adjusting the driven load N to a larger value. With the large driven load N, the frictional force F increases. Thus, by the winding angle changing unit 40 alone, even in a case of a limited range in which the frictional force F can be changed, the adjustable range of the frictional force F can be extended by controlling the winding angle θ and the driven load N in combination. Therefore, by more appropriately adjusting the frictional force F, it is possible to more effectively achieve both the effect of suppressing wrinkling and ensuring the transport position accuracy.

According to the fourth exemplary embodiment, the following effects can be achieved.

(12) The printing apparatus 11 includes the driven load changing unit 90 configured to change the driven load N which is the load that the printing medium 99 nipped by the transport roller 25 and the driven roller 26 receives from the driven roller 26. The control unit 70 changes the driven load N by controlling the driven load changing unit 90. According to this configuration, in addition to the winding angle θ, the driven load can be changed, making it possible to more appropriately adjust the frictional force between the printing medium 99 and the transport roller 25. This makes it possible to more effectively suppress printing defects caused by wrinkling and printing defects caused by a transport position shift.

Modified Examples

This exemplary embodiment can be modified and implemented as follows. The exemplary embodiment and the following modified examples can be combined and implemented within a technically consistent range.

Figure 14:
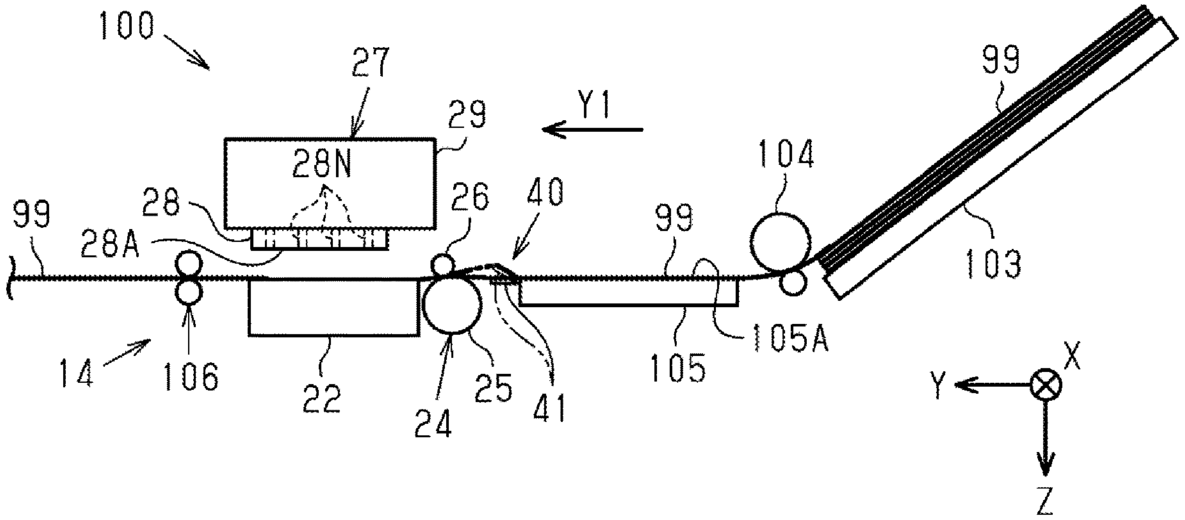
FIG. 14 is a schematic side sectional view illustrating a printing apparatus according to a modified example.

- In each of the exemplary embodiments described above, the winding angle θ is adjusted in accordance with the medium type, the roll weight, or the like. However, depending on the configuration of the members of the printing apparatus 11 and the parameters to be considered, the degree of adjustment is not limited to the content described above. For example, the winding angle θ may be set to a smaller value for a higher roll weight. In a case in which the back tension to the medium 99 caused by the roll weight is high, the winding angle θ may be decreased to adjust the back tension to an appropriate value. The same applies to the roll diameter and the transport load. For example, the winding angle θ may be set to a smaller value for a larger roll diameter. Further, for example, the winding angle θ may be set to a smaller value for a larger transport load. Decreasing the winding angle θ decreases the back tension B and the frictional force F that is a force in the same direction as the transport load. This brings the excessive back tension B and the excessive transport load closer to appropriate values.
- In each of the embodiments described above, the configuration is not limited to the winding angle θ being adjusted in accordance with the medium type, and a configuration may be adopted in which the winding angle θ is changed between when printing is stopped and when printing is executed. Here, printing being executed means a print job being executed, and printing being stopped means a print job being stopped. For example, in a case in which the printing medium 99 is left in a state of being nipped by the transport roller pair 24 until the next printing is started, there is a concern that a curl may occur in the printing medium 99. To suppress this kind of curl, the winding angle θ may be changed between while printing and while stopped. The control unit 70 controls the winding angle changing unit 40 so that the winding angle θ when printing is stopped is smaller than the winding angle θ when printing is executed. For example, in the case of the winding angle changing unit 40 according to the first exemplary embodiment, before printing is started, the flap 41 is disposed at a guide position illustrated in FIG. 4, thereby adjusting the winding angle θ to a small value when printing is stopped. When printing is started, the control unit 70 arranges the flap 41 at a guide position illustrated in FIG. 5, thereby adjusting the winding angle θ to the large value when printing is executed. The winding angle θ when printing is executed may be a constant value regardless of the medium type or may be changed to a value corresponding to the medium type as in each of the exemplary embodiments described above. While printing is stopped, the winding angle θ may be adjusted to a minimum value, for example. Note that "when printing is stopped" may only refer to while printing is stopped with the power on, but may include with the power off as well. According to this configuration, the control unit 70 controls the winding angle changing unit 40, thereby adjusting the winding angle θ when printing is stopped to a smaller value than the winding angle θ when printing is executed. Thus, while printing is executed, the winding angle θ can be adjusted to an appropriate value and, while printing is stopped, the winding angle θ is changed to a value smaller than the winding angle θ when printing is executed. This makes it possible to suppress the formation of a curl in the portion of the printing medium 99 that comes into contact with the transport roller 25 while printing is stopped.
- Note that the control unit 70 may adjust the winding angle θ at more detailed timing. Specifically, the winding angle θ may be increased when a print job is being executed and the printing medium 99 is being transported, and the winding angle θ may be decreased when the printing medium 99 is not being transported. This makes it possible to suppress the formation of a curl.
- As illustrated in FIG. 14, a printing apparatus 100 that performs printing on the printing medium 99 that is cut paper may be used. The printing apparatus 100 includes a placement unit 103 on which the printing medium 99 is placed, a feeding roller 104 that feeds the printing medium 99 placed on the placement unit 103, and a support portion 105 including a support face 105A that supports the fed printing medium 99. The support face 105A may be a flat surface, for example. The transport roller pair 24 constituting the transport unit 14 is positioned downstream of the feeding roller 104 in the transport direction Y1. The transport roller pair 24 includes the transport roller 25 and the driven roller 26. A portion of the printing medium 99 between the feeding roller 104 and the transport roller pair 24 is supported by the support face 105A. The winding angle changing unit 40 is disposed at a position upstream of the transport roller pair 24 and downstream of the feeding roller 104 in the transport direction Y1. The winding angle changing unit 40 is configured to change the winding angle at which the transported printing medium 99 comes into contact with the transport roller 25. Downstream of the transport roller pair 24 in the transport direction Y1 are provided the support 22 that supports the printing medium 99 at a printing position, and a discharge roller pair 106 that discharges the printing medium 99 on which printing was performed at the printing position. Preferably, the printing medium 99 when the winding angle θ is adjusted by the winding angle changing unit is nipped at two locations of the transport roller 25 and another roller upstream of the transport roller 25. For example, another transport roller (not illustrated) may be disposed on the path between the feeding roller 104 and the transport roller 25. Even in the case of the printing medium 99 such as a cut sheet, it is possible to achieve both suppression of wrinkling and improvement of high transport position accuracy by adjustment of the winding angle θ. This makes it possible to suppress a reduction in printing quality caused by wrinkling and a reduction in transport position accuracy.

In the exemplary embodiment described above, a configuration may be adopted in which adjustment of the winding angle θ using the winding angle changing unit 40, and tension control (back tension control (BTC)) in which the back tension B is adjusted by controlling the feeding motor 16 are performed. BTC is control for adjusting the back tension B to an appropriate value by control of the feeding motor 16. The control unit 70 controls the feeding unit 15, thereby performing tension control for adjusting the tension in the printing medium 99 fed from the roll 101. In a case in which there is a limit by only adjustment of the frictional force F by the winding angle θ according to the model of the printing apparatus 11, the printing conditions, and the medium type, the frictional force F is also adjusted according to the back tension B adjusted by BTC using the feeding motor 16. The back tension B, which is one of the parameters for determining the frictional force F, is also adjusted by Equation (1) described above. This makes it possible to adjust the frictional force F more appropriately. Although the number of controls performed by the control unit 70 with respect to the feeding motor 16 is increased by one, by controlling the frictional force F from both the winding angle θ and the back tension B by the winding angle changing unit 40, it is possible to increase the adjustable range of the frictional force F and accommodate a greater number of medium types. Here, the back tension B is adjusted in accordance with the medium type. Specifically, for medium types that readily wrinkle, the back tension B is applied between the printing medium 99 and the transport roller pair 24 to the extent that wrinkling can be suppressed. On the other hand, for medium types that do not readily wrinkle, the back tension B is applied between the printing medium 99 and the transport roller pair 24 to the extent that the back tension B does not cause slippage resulting in a reduction in transport position accuracy. According to this configuration, by the tension control for adjusting the tension of the printing medium 99 fed from the roll 101, wrinkling can be effectively suppressed and the transport position accuracy is readily ensured.

The winding angle changing unit 40 is not limited to the configurations of the first to third exemplary embodiments, and may change the winding angle θ using another principle. For example, a raising and lowering function for raising and lowering the transport roller 25 may be provided. A configuration may be adopted in which the direction in which the printing medium 99 enters the outer circumferential surface 25A from the support portion 21 is changed by changing the position of the transport roller 25 relative to the support portion 21.

A roller changing mechanism configured to change the position at which the driven roller 26 comes into contact with the outer circumferential surface 25A of the transport roller 25 in a circumferential direction of the outer circumferential surface 25A may be provided as an example of the winding angle changing unit. This roller changing mechanism changes the nipping position at which the driven roller 26 comes into contact with the outer peripheral surface 25A in the circumferential direction, thereby changing the winding angle θ at which the printing medium 99 comes into contact with the transport roller 25.

The winding angle changing unit 40 of each of the exemplary embodiments described above guides the printing medium 99 from a back face that is the surface opposite to the printed surface. For example, one of the flap 41, the variable member 51, and the supporting roller 61 may be brought into contact with the front face of the printing medium 99 to guide the printing medium 99. Note that, in the winding angle changing unit 40 of each exemplary embodiment described above in which the guide surface comes into contact with the back face of the printing medium 99, the driving system including the motor and the power transmission mechanism is disposed utilizing the space on the lower side of the support portion 21, making it possible to avoid an increase in the size of the printing apparatus 11 to the extent possible.

In a case in which the printing apparatus 11 is a serial printer, the control unit 70 may adjust the winding angle to different values in accordance with the printing operation performed on the printing medium 99. For example, during a print job, the winding angle θ when printing is being performed on the printing medium 99 may be set larger than the winding angle θ when printing is not being performed on the printing medium 99. According to this configuration, it is possible to suppress a position shift of the printing medium 99 caused by an external force or the like during the printing performed while transport of the printing medium 99 is stopped, which leads to an improvement in printing position accuracy.

An intermediate roller may be disposed between the feeding unit 15 and the transport roller pair 24. In this case, slack control for forming slack in a portion of the printing medium 99 fed from the roll 101 may be performed. That is, the control unit 70 controls the feeding motor 16 so as to form slack in the portion of the printing medium 99 between the roll 101 and the intermediate roller. The control unit 70 may perform tension control in which the back tension B is applied to a portion of the printing medium 99 between the intermediate roller and the transport roller pair 24.

In each of the exemplary embodiments described above, the winding angle θ is changed in accordance with the medium type. However, instead of the medium type, the winding angle θ may be changed in accordance with a parameter other than the medium type. Examples of other parameters include at least one of roll weight, roll diameter, humidity, and temperature.

The frictional force F between the printing medium 99 and the transport roller 25 may be measured or estimated, and the control unit 70 may perform control for adjusting the winding angle θ so that the frictional force F approaches the target frictional force for each medium type. For measurement or estimation of the frictional force F, information of the transport load detected by the transport load detector 84 may be used. Further, the user may use a measurement device to measure the frictional force F or a value of information enabling identification of the frictional force F.

A configuration may be adopted in which the control unit 70 is configured to control the winding angle changing unit 40 on the basis of the frictional force F, the winding angle θ, or other input values input by the user by operating the operation units 33, 112, adjusting the winding angle θ according to the input values.

The control unit 70 may control the feeding motor 16 so that a feeding torque when the printing medium 99 is fed from the roll 101 in accordance with the roll diameter is constant. According to this configuration, it is possible to reduce the rotation start delay of the roll 101. In this case, the control for changing the winding angle θ in accordance with the roll diameter may be omitted.

The transport roller 25 is not limited to being a driving roller constituting the transport roller pair 24. The transport roller 25 may be a single roller that does not include the driven roller that forms a pair. For example, the transport roller 25 may be a roller that comes into contact with a surface opposite to the guide surface of the printing medium 99 guided along the guide surface, and applies a transport force to the printing medium 99.

The transport unit 14 is not limited to a configuration including one transport roller pair 24, and a configuration including the transport roller pair 24 and another transport roller pair or a transport roller may be adopted. The other transport roller pair or transport roller may be a discharge roller pair that transports the portion of the printing medium 99 on which printing was performed to outside the housing 12. In a case of being positioned on the transport path between the feeding unit 15 and the transport roller pair 24, the other transport roller pair or other transport roller may be a roller that changes the winding angle θ.

In the exemplary embodiment described above, a configuration may be adopted in which the support 22 does not include the suction mechanism 30. That is, the support 22 may be configured to support the printing medium 99 at the support face 22A without a suction hole.

The printing apparatus 11 is not limited to a serial printer and may be a line printer or a page printer. In a case in which the printing apparatus 11 is a line printer, the printing unit 27 does not include the carriage 29, and includes a printing head capable of simultaneously printing a range longer than the maximum width of the printing medium 99. The printing head performs printing on the printing medium 99 transported at a predetermined velocity by the transport unit 14. In this case, the printing head may be an ejecting head (ejecting unit) that ejects liquid such as ink.

The printing apparatus 11 is not limited to an inkjet printer and may be an electrophotographic printer such as a laser printer. Further, the printing apparatus 11 may be a dot impact-type printer or a thermal transfer printer.

The printing apparatus 11 may be a textile printing apparatus of an inkjet type or may be a textile printing apparatus of another printing type.

The printing apparatus 11 may include an image scanning unit (scanner). When the printing apparatus 11 includes an image scanning unit, the printing apparatus 11 may be a multifunction device.

Hereinafter, technical concepts and effects thereof that are introduced from the above exemplary embodiments and modified examples will be described.

(A) A printing apparatus includes a transport roller configured to apply a transport force to a printing medium and transport the printing medium, a printing unit configured to perform printing on the printing medium transported, and a winding angle changing unit provided upstream of the transport roller in a transport direction of the printing medium and configured to change a winding angle at which the printing medium comes into contact with an outer circumferential surface of the transport roller.

According to this configuration, it is possible to adjust the winding angle at which the printing medium comes into contact with the outer circumferential surface of the transport roller. Thus, both the effect of suppressing wrinkling in the printing medium before compression by the transport roller and ensuring the transport position accuracy of the printing medium transported by the transport roller are achieved.

(B) The printing apparatus described above may include a feeding unit configured to support a roll obtained by winding the printing medium into a roll shape at a position upstream of the transport roller in the transport direction and feed the printing medium from the roll.

According to this configuration, in a configuration in which the transport roller transports the printing medium long in length and fed from the roll by the feeding unit, both the effect of suppressing wrinkling in the printing medium before compression by the transport roller and ensuring the transport position accuracy of the printing medium transported by the transport roller are readily achieved.

(C) The printing apparatus described above may include a support portion provided upstream of the transport roller in the transport direction and configured to support the printing medium.

According to this configuration, it is possible to support a portion of the printing medium fed from the feeding unit before arrival at the transport roller by the support portion. With the printing medium supported by the support portion, wrinkling is less likely to occur.

(D) In the printing apparatus described above, the winding angle changing unit may include a flap configured to change in angle with respect to the support portion at a portion of the support portion on the transport roller side.

According to this configuration, the angle of the flap is changed to adjust the winding angle at which the printing medium comes into contact with the outer circumferential surface of the transport roller. With just the flap configured to change in angle with respect to the support portion being required, the printing apparatus is less likely to increase in size.

(E) In the printing apparatus described above, the winding angle changing unit may include an exiting portion configured to change in position at a portion of the support portion on the transport roller side.

According to this configuration, the position of the exiting portion that is a portion of the support portion on the transport unit side is changed to adjust the winding angle at which the printing medium comes into contact with the outer circumferential surface of the transport roller. With just the exiting portion of the support portion needing to be repositionably provided, the printing apparatus is less likely to increase in size.

(F) In the printing apparatus described above, the winding angle changing unit may be configured to change a position of the support portion.

According to this configuration, the position of the support portion is changed to adjust the winding angle at which the printing medium comes into contact with the outer circumferential surface of the transport roller. With just the support portion itself needing to be repositionably provided, a simple configuration with a small number of parts is all that is required, making the printing apparatus less likely to increase in size.

(G) In the printing apparatus described above, the support portion may be a roller, and the winding angle changing unit may be configured to change a position of the roller.

According to this configuration, the position of the roller also serving as the support portion is changed to adjust the winding angle at which the printing medium comes into contact with the outer circumferential surface of the transport roller. With just the roller also serving as the support portion needing to be repositionably provided, a simple configuration with a small number of parts is all that is required, making the printing apparatus less likely to increase in size.

(H) The printing apparatus described above may include a control unit configured to control the winding angle changing unit so that the winding angle when printing is stopped is smaller than the winding angle when printing is executed.

According to this configuration, the control unit controls the winding angle changing unit, thereby adjusting the winding angle when printing is stopped to a smaller value than the winding angle when printing is executed. Thus, while printing is executed, the winding angle can be adjusted to an appropriate value and, while printing is stopped, the winding angle is changed to a value smaller than the winding angle θ when printing is executed. This makes it possible to suppress the formation of a curl in the portion of the printing medium that comes into contact with the transport roller while printing is stopped.

(I) The printing apparatus described above may include a driven roller driven by the transport roller, a driven load changing unit configured to change a driven load, which is a load that the printing medium nipped by the transport roller and the driven roller receives from the driven roller, and a control unit configured to change the driven load by controlling the driven load changing unit.

According to this configuration, in addition to the winding angle, the driven load can be changed, making it possible to more appropriately adjust the frictional force between the printing medium and the transport roller. This makes it possible to more effectively suppress printing defects caused by wrinkling and printing defects caused by a transport position shift.

(J) The printing apparatus described above may include a determination unit configured to determine a type of the printing medium, and the winding angle changing unit may be configured to change the winding angle in accordance with the type of the printing medium.

According to this configuration, it is possible to adjust the winding angle to an appropriate value corresponding to the type of the printing medium. Thus, both the effect of suppressing wrinkling in the printing medium and ensuring the transport position accuracy of the printing medium transported by the transport roller are achieved.

(K) The printing apparatus described above may include a control unit configured to control the feeding unit to perform tension control for adjusting a tension of the printing medium fed from the roll.

According to this configuration, by the tension control for adjusting the tension of the printing medium fed from the roll, wrinkling can be effectively suppressed and the transport position accuracy is readily ensured.

(L) The printing apparatus described above may include a roll weight estimation unit configured to estimate a weight of the roll, and the winding angle changing unit may be configured to change the winding angle in accordance with the weight of the roll.

According to this configuration, it is possible to change the winding angle in accordance with the weight of the roll, thereby readily achieving both the effect of suppressing wrinkling and ensuring the transport position accuracy.

(M) The printing apparatus described above may include a roll diameter estimation unit configured to estimate a diameter of the roll, and the winding angle changing unit may be configured to change the winding angle in accordance with the diameter of the roll.

According to this configuration, it is possible to change the winding angle in accordance with the diameter of the roll, thereby readily achieving both the effect of suppressing wrinkling and ensuring the transport position accuracy.

What is claimed is:

1. A printing apparatus comprising:
- a printing unit configured to perform printing on the printing medium;
- a final upstream transport roller being a final roller that is upstream of the printing unit and configured to apply a transport force in a transport direction to the printing medium to transport the printing medium to the printing unit; and
- a roller angle changing unit provided upstream of the final upstream transport roller in a transport direction of the printing medium and configured to change a winding-roller angle at which the printing medium comes into contact with an outer circumferential surface of the final upstream transport roller.

2. The printing apparatus according to claim 1, comprising:
- a feeding unit configured to support a roll obtained by winding the printing medium into a roll shape at a position upstream of the final upstream transport roller in the transport direction and feed the printing medium from the roll.

3. The printing apparatus according to claim 2, comprising:
- a support portion provided upstream of the final upstream transport roller in the transport direction and configured to support the printing medium.

4. The printing apparatus according to claim 3, wherein the roller angle changing unit includes a flap configured to change in angle with respect to the support portion, the flap being provided at a portion of the support portion on the final upstream transport roller side.

5. The printing apparatus according to claim 3, wherein the winding roller angle changing unit includes an exiting portion configured to change in position at a portion of the support portion on the final upstream transport roller side.

6. The printing apparatus according to claim 3, wherein the roller angle changing unit is configured to change a position of the support portion.

7. The printing apparatus according to claim 6, wherein the support portion is a roller and the roller angle changing unit is configured to change a position of the final upstream transport roller.

8. The printing apparatus according to claim 2, comprising:

a control unit configured to control the feeding unit to perform tension control for adjusting a tension of the printing medium fed from the roll.

9. The printing apparatus according to claim 2, comprising:

a roll weight estimation unit configured to estimate a weight of the roll, wherein the roller angle changing unit is configured to change the winding-roller angle in accordance with the weight of the roll.

10. The printing apparatus according to claim 2, comprising:

a roll diameter estimation unit configured to estimate a diameter of the roll, wherein the roller angle changing unit is configured to change the roller angle in accordance with the diameter of the roll.

11. The printing apparatus according to claim 1, comprising:

a control unit configured to control the roller angle changing unit so that the roller angle when printing is stopped is smaller than the roller angle when printing is executed.

12. The printing apparatus according to claim 1, comprising:

a driven roller driven by the final upstream transport roller;

a driven load changing unit configured to change a driven load, the driving load is a load that the printing medium nipped by the final upstream transport roller and the driven roller receives from the driven roller; and a control unit configured to change the driven load by controlling the driven load changing unit.

13. The printing apparatus according to claim 1, comprising:

a determination unit configured to determine a type of the printing medium, wherein the roller angle changing unit is configured to change the roller angle in accordance with the type of the printing medium.

* * * * *